United States Patent
Ayupov et al.

(10) Patent No.: US 11,243,775 B2
(45) Date of Patent: Feb. 8, 2022

(54) SYSTEM, APPARATUS AND METHOD FOR PROGRAM ORDER QUEUE (POQ) TO MANAGE DATA DEPENDENCIES IN PROCESSOR HAVING MULTIPLE INSTRUCTION QUEUES

(71) Applicant: Intel Corporation, Santa Clara, CA (US)

(72) Inventors: Andrey Ayupov, Santa Clara, CA (US); Srikanth T. Srinivasan, Portland, OR (US); Jonathan D. Pearce, Hillsboro, OR (US); David B. Sheffield, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/364,688

(22) Filed: Mar. 26, 2019

(65) Prior Publication Data
US 2020/0310815 A1    Oct. 1, 2020

(51) Int. Cl.
*G06F 9/38* (2018.01)
(52) U.S. Cl.
CPC .......... *G06F 9/3838* (2013.01); *G06F 9/3814* (2013.01); *G06F 9/3851* (2013.01)
(58) Field of Classification Search
CPC ..... G06F 9/3838; G06F 9/3851; G06F 9/3814
See application file for complete search history.

(56) References Cited

U.S. PATENT DOCUMENTS

| | | | |
|---|---|---|---|
| 5,193,166 A | 3/1993 | Menasce | |
| 5,471,593 A * | 11/1995 | Branigin | G06F 9/30018 712/219 |
| 5,717,882 A | 2/1998 | Abramson et al. | |
| 5,826,052 A | 10/1998 | Stiles | |
| 6,128,704 A | 10/2000 | Jun | |
| 6,859,861 B1 | 2/2005 | Rhodes | |

(Continued)

OTHER PUBLICATIONS

Honesty Cheng Young. Evaluation of a decoupled computer architecture and the design of a vector extension (pipelined processor; delayed branch, code scheduling, software pipelining, queue register). Ph.D. Dissertation. The University of Wisconsin—Madison (Year: 1985).*

(Continued)

*Primary Examiner* — William B Partridge
*Assistant Examiner* — Kasim Alli
(74) *Attorney, Agent, or Firm* — Trop, Pruner & Hu, P.C.

(57) ABSTRACT

In one embodiment, an apparatus includes: a plurality of registers; a first instruction queue to store first instructions; a second instruction queue to store second instructions; a program order queue having a plurality of portions each associated with one of the plurality of registers, each of the portions having entries to store a state of an instruction, the state comprising an encoding of a use of the register by the instruction and a source instruction queue for the instruction; and a dispatcher to dispatch for execution the first and second instructions from the first and second instruction queues based at least in part on information stored in the program order queue, to manage instruction dependencies between the first instructions and the second instructions. Other embodiments are described and claimed.

20 Claims, 21 Drawing Sheets

(56) References Cited

U.S. PATENT DOCUMENTS

| | | | |
|---|---|---|---|
| 7,904,905 B2* | 3/2011 | Cervini | G06F 9/4843 718/101 |
| 2002/0188806 A1 | 12/2002 | Rakvic | |
| 2008/0209129 A1 | 8/2008 | Van De Waerdt | |
| 2008/0222387 A1 | 9/2008 | Williamson | |
| 2013/0046922 A1 | 2/2013 | Pan | |
| 2016/0147669 A1 | 5/2016 | Huang | |
| 2017/0351610 A1 | 12/2017 | Tran | |
| 2018/0189179 A1 | 7/2018 | Li | |
| 2019/0042269 A1 | 2/2019 | Pearce et al. | |

OTHER PUBLICATIONS

Young, H. Goodman, J. "The Design of a Queue-Based Vector Supercomputer", Proceedings of the 1986 Int'l Conf. on Parallel Processing, pp. 483-486. (Year: 1986).*

U.S. Appl. No. 16/364,704, filed Mar. 26, 2019, entitled "System, Apparatus and Method for Symbolic Store Address Generation for Data-Parallel Processor" by Jeffrey J. Cook, et al.

U.S. Appl. No. 16/364,725, filed Mar. 26, 2019, entitled "Gather-Scatter Cache Architecture for Single Program Multiple Data (SPMD) Processor" by Jeffrey J. Cook, et al.

U.S. Appl. No. 16/147,696, filed Sep. 29, 2018, entitled "Apparatus and Method for Adaptable and Efficient Lane-Wise Tensor Processing," by Jonathan Pearce, et al.

U.S. Appl. No. 16/220,528, filed Dec. 14, 2018, entitled "Appartus and Method for a High Throughput Parallel Co-Processor and Interconnect With Low Offload Latency," by Jonathan Pearce, et al.

U.S. Appl. No. 16/147,692, filed Sep. 29, 2018, entitled "Architecture and Method for Data Parallel Single Program Multiple Data (SPMD) Execution," by Jonathan Pearce, et al.

Sam S. Stone, et al., "Address-Indexed Memory Disambiguation and Store-To-Load Forwarding," Nov. 12, 2015, 12 pages total.

European Patent Office, European Search Report dated Aug. 18, 2020 in European patent application No. 20 15 3492.2, 10 pages total.

Erika Gunadi, et al., "CRIB: Consolidated Rename, Issue and Bypass," Jun. 4, 2011, 10 pages total.

Jie S. Hu, et al., "Exploring Wakeup-Free Instruction Scheduling," Feb. 14, 2004, 10 pages total.

* cited by examiner

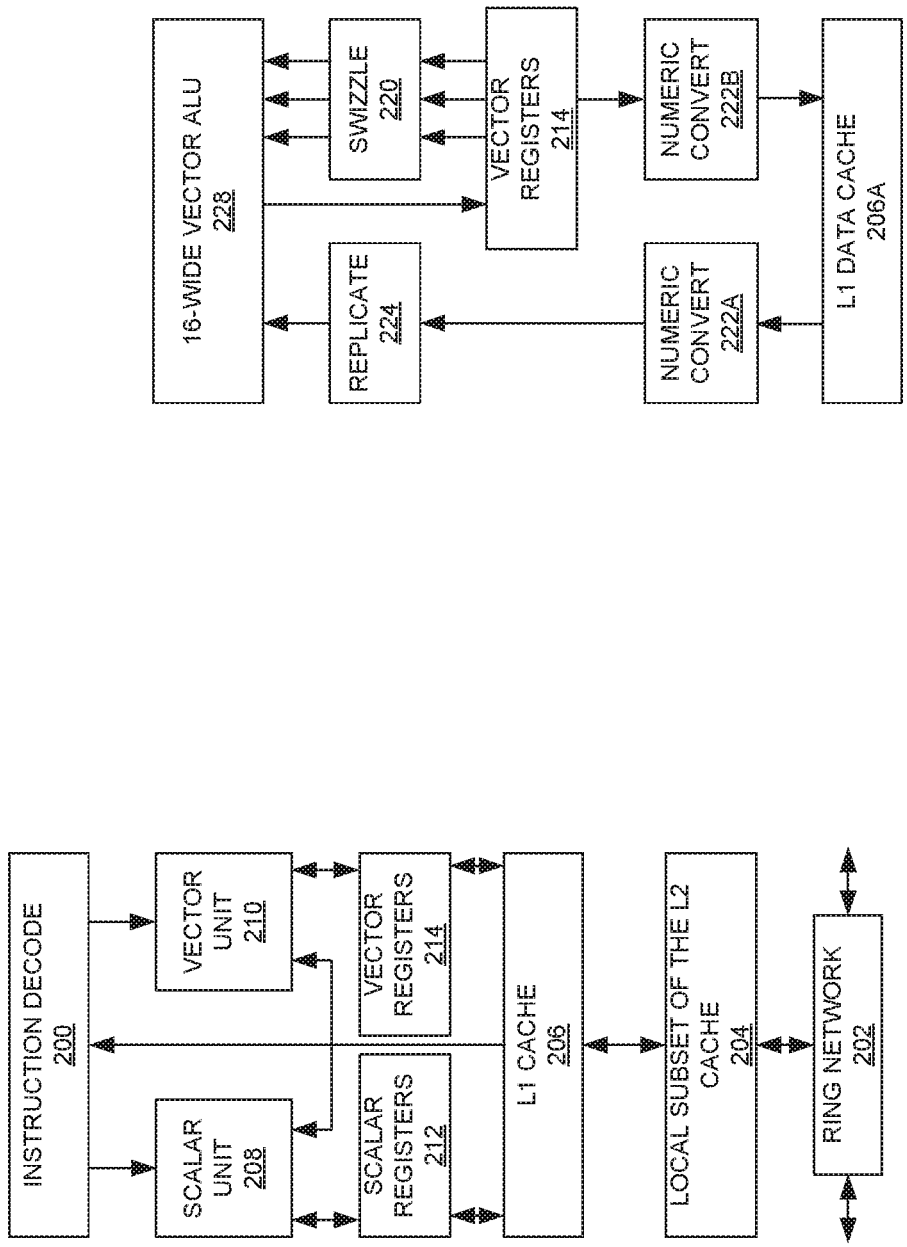

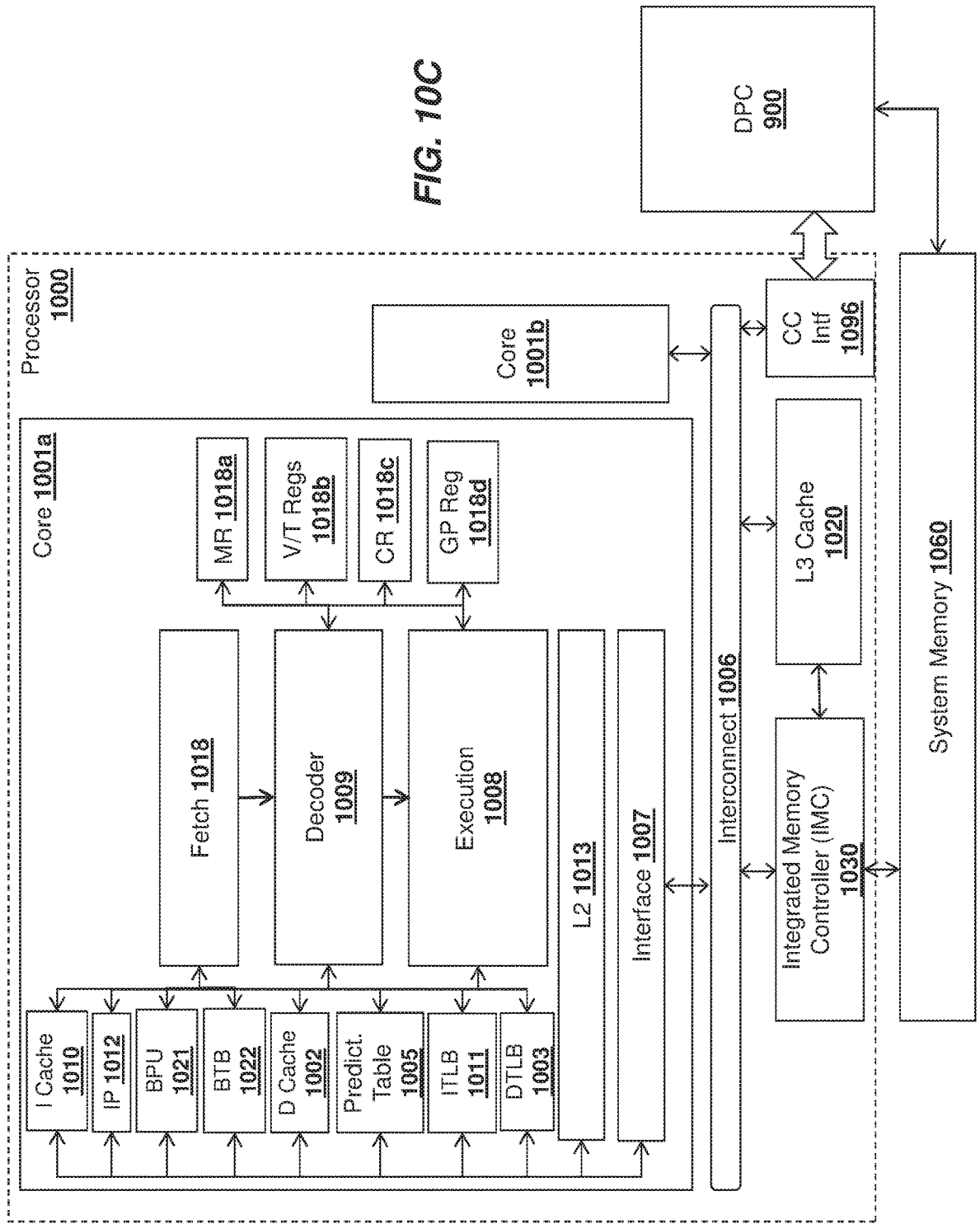

SYSTEM, APPARATUS AND METHOD FOR PROGRAM ORDER QUEUE (POQ) TO MANAGE DATA DEPENDENCIES IN PROCESSOR HAVING MULTIPLE INSTRUCTION QUEUES

TECHNICAL FIELD

Embodiments relate to handling data dependencies in a processor.

BACKGROUND

In-order processors are very power efficient but suffer from low instruction level parallelism and thus execution throughput. In contrast, out-of-order (OOO) processor architectures improve execution throughput by allowing independent instructions to execute out of order. OOO architectures are significantly more power hungry due to their complexity, e.g., due to managing instruction dependencies, register renaming support, and broadcast instruction completion logic to unblock dispatch of dependent instructions, etc. Typically, a processor is either formed with an in-order architecture or an out-of-order architecture.

BRIEF DESCRIPTION OF THE DRAWINGS

FIGS. 2A-B illustrate a block diagram of a more specific exemplary in-order core architecture in accordance with an embodiment of the present invention.

FIGS. 10A-C are block diagrams of the data parallel cluster integrated in a computer system in a variety of ways in accordance with an embodiment of the present invention.

DETAILED DESCRIPTION

Figure 1A:
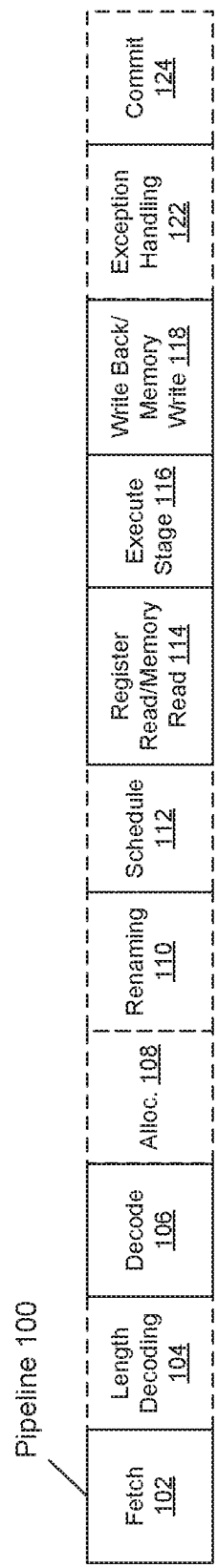
FIG. 1A is a block diagram illustrating both an exemplary in-order pipeline and an exemplary register renaming, out-of-order issue/execution pipeline according to embodiments of the invention.

In various embodiments, techniques are provided in a processor to preserve program order of dependent instructions during execution in a processor pipeline having multiple in-order instruction queues. More particularly, embodiments may be used in a processor having a single program multiple data (SPMD) architecture. In a particular implementation, a processor architecture is provided that includes various front end circuitry configured to operate on individual instructions and a plurality of execution lanes including execution units, each of which is configured to perform operations for these instructions on a per lane basis. In an embodiment, the front end scheduler co-dispatches the same instruction across the execution lanes in a single program multiple data model.

This processor architecture is provided with multiple in-order queues that can dispatch instructions for execution in parallel. For example, a SPMD processor may include multiple instruction queues, where memory instructions are stored in a first instruction queue and arithmetic-based instructions (referred to herein as ALU instructions) are stored in a second instruction queue. Instructions are dispatched from each of these instruction queues to parallel execution pipelines in-order. However this dispatch can only occur where instructions are independent. Otherwise, the instruction dispatch has to preserve the dependency between dispatched instructions driven by the program order. There are three types of dependencies to be handled: write-after-write (WAW), read-after-write (RAW) and write-after-read (WAR) dependencies between operands of instructions under consideration. WAW and WAR dependencies are not true data dependencies, but are present due to a limited number of registers that can exist in a given architecture.

To overcome this problem of limited registers, a technique called register renaming is used in typical OOO architectures where, for each destination register of an instruction, a row is allocated in a register renaming table with a row ID that is used as a new destination operand ID. Therefore, instructions will not have the same register destination, avoiding WAW and WAR dependencies as long as the register renaming table is not full. However such register renaming logic is usually power intensive. For RAW, also known as a data flow dependency, each operand for instructions in the instruction queues is associated with a bit that signifies if the operand is ready (finished execution and refers to the correct data). When execution of an instruction completes, a destination register ID is broadcasted to all queues. For every operand in any instruction in every instruction queue, typical OOO architectures include logic that compares the broadcasted register ID to its own register ID, and when it matches the logic toggles the completion bit. This comparison logic is also usually power intensive.

In embodiments, instruction dependencies between instructions in different ones of multiple instruction queues can be managed without use of register renaming or power-hungry comparison logic. In particular, a pipeline including M instruction queues may include a data structure, referred to herein as a program order queue (POQ), that includes N queues, where N is the number of architectural registers. Each POQ is associated with a given architectural register and may include a plurality of entries each to store state information having an element bit width of log (2*M) bits. The depth of each POQ (i.e., the number of entries) affects the number of in-flight instructions, and may be tuned for a given implementation to obtain the best performance. The arrangement of the POQ data structure is dependent on the number of architectural registers (N) and the number of independent instruction queues (M). Note that herein, the terms "operations" and "instructions" are used interchangeably. Furthermore, while particular techniques for handling ordering of instructions are described in the context of multiple instruction queues, understand that in at least certain architectures, user-level instructions may be decoded into one or more micro-instructions (uops) that are machine-level instructions actually executed in execution units, and in turn stored in the instruction queues herein (and information of which is stored in the POQs) or more micro-instructions (uops) that are machine-level instructions actually executed in execution units, and in turn stored in the instruction queues herein (and information of which is stored in the POQs). As such, the POQ dependency information is based on the uop representation, which is also the representation used for dispatch. For ease of generality, the terms "operations," "instructions," and "uops" are used interchangeably.

Using a POQ as described herein may advantageously enable handling of all three kinds of dependencies (WAR, RAW and WAW) at once. And, by leveraging information present in the POQ, eager instruction dispatch may proceed from multiple instruction queues while preserving original program order, resulting in higher performance than an in-order architecture and higher power efficiency than an out-of-order processor having logic used to handle dependency analysis techniques. As such, an SPMD processor architecture in accordance with an embodiment may be a hybrid of an in-order and out-of-order processor. As will be described herein, out-of-order performance may be obtained without register renaming and/or without a content addressable memory (CAM)-based scheduler. And data dependencies may be enforced across instructions issuing from multiple instruction queues. With an embodiment that implements eager instruction dispatching from multiple in-order instruction queues, improved performance (e.g., in the form of increased instructions per cycle) may be realized with power consumption that is comparable to an in-order architecture.

Figure 1B:
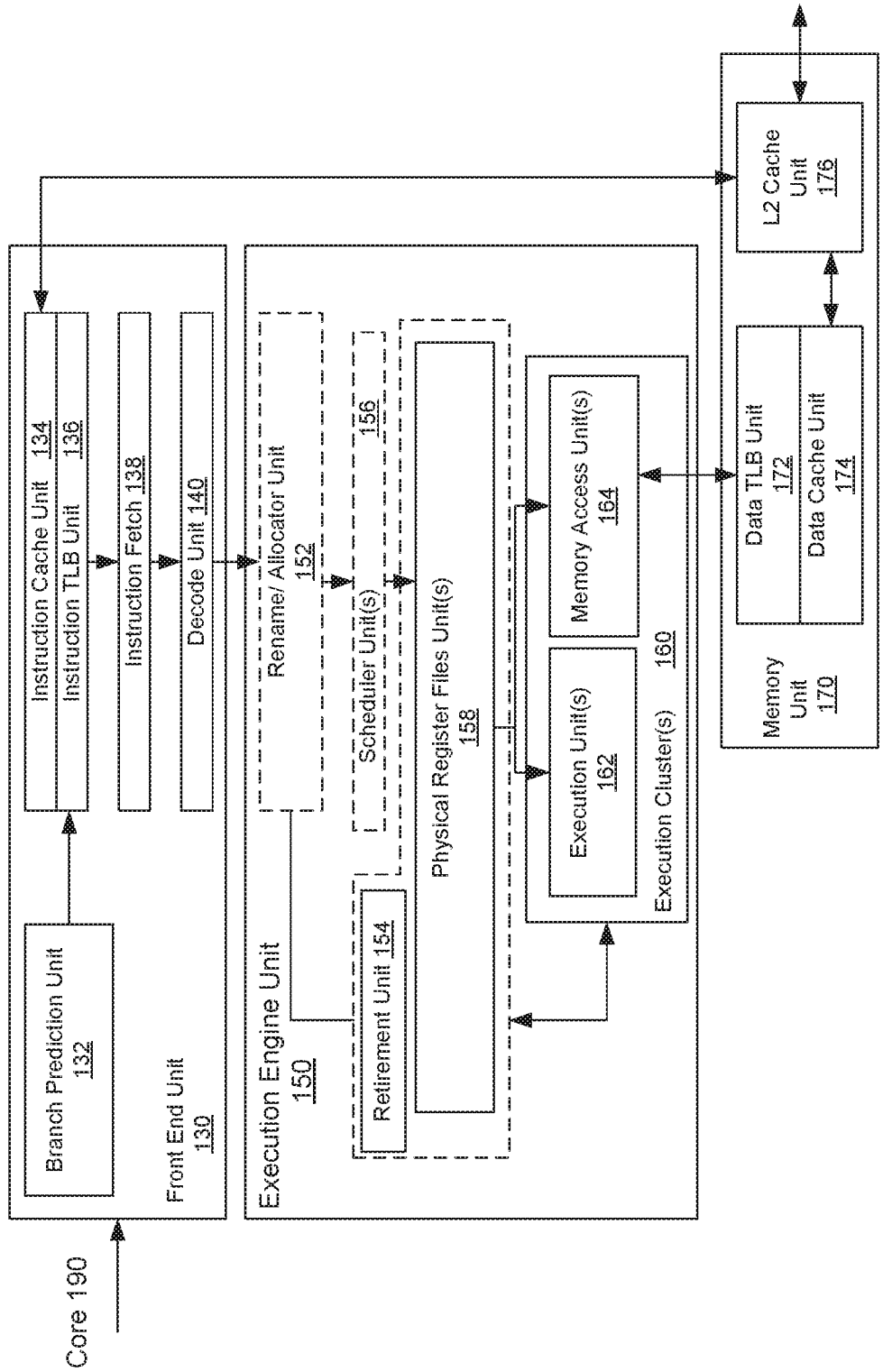
FIG. 1B is a block diagram illustrating both an exemplary embodiment of an in-order architecture core and an exemplary register renaming, out-of-order issue/execution architecture core to be included in a processor according to embodiments of the invention.

FIG. 1A is a block diagram illustrating both an exemplary in-order pipeline and an exemplary register renaming, out-of-order issue/execution pipeline according to embodiments of the invention. FIG. 1B is a block diagram illustrating both an exemplary embodiment of an in-order architecture core and an exemplary register renaming, out-of-order issue/execution architecture core to be included in a processor according to embodiments of the invention. The solid lined boxes in FIGS. 1A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 1A, a processor pipeline 100 includes a fetch stage 102, a length decode stage 104, a decode stage 106, an allocation stage 108, a renaming stage 110, a scheduling (also known as a dispatch or issue) stage 112, a register read/memory read stage 114, an execute stage 116, a write back/memory write stage 118, an exception handling stage 122, and a commit stage 124.

FIG. 1B shows processor core 190 including a front end unit 130 coupled to an execution engine unit 150, and both are coupled to a memory unit 170. The core 190 may be a reduced instruction set computing (RISC) core, a complex instruction set computing (CISC) core, a very long instruction word (VLIW) core, or a hybrid or alternative core type. As yet another option, the core 190 may be a special-purpose core, such as, for example, a network or communication core, compression engine, coprocessor core, general purpose computing graphics processing unit (GPGPU) core, graphics core, or the like.

The front end unit 130 includes a branch prediction unit 132 coupled to an instruction cache unit 134, which is coupled to an instruction translation lookaside buffer (TLB) 136, which is coupled to an instruction fetch unit 138, which is coupled to a decode unit 140. The decode unit 140 (or decoder) may decode instructions, and generate as an output one or more micro-operations, micro-code entry points, microinstructions, other instructions, or other control signals, which are decoded from, or which otherwise reflect, or are derived from, the original instructions. The decode unit 140 may be implemented using various different mechanisms. Examples of suitable mechanisms include, but are not limited to, look-up tables, hardware implementations, programmable logic arrays (PLAs), microcode read only memories (ROMs), etc. In one embodiment, the core 190 includes a microcode ROM or other medium that stores microcode for certain macroinstructions (e.g., in decode unit 140 or otherwise within the front end unit 130). The decode unit 140 is coupled to a rename/allocator unit 152 in the execution engine unit 150.

The execution engine unit 150 includes the rename/allocator unit 152 coupled to a retirement unit 154 and a set of one or more scheduler unit(s) 156. The scheduler unit(s) 156 represents any number of different schedulers, including reservations stations, central instruction window, etc. The scheduler unit(s) 156 is coupled to the physical register file(s) unit(s) 158. Each of the physical register file(s) units 158 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 158 comprises a vector registers unit and a scalar registers unit. These register units may provide architectural vector registers, vector mask registers, and general purpose registers. The physical register file(s) unit(s) 158 is overlapped by the retirement unit 154 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 154 and the physical register file(s) unit(s) 158 are coupled to the execution cluster(s) 160. The execution cluster(s) 160 includes a set of one or more execution units 162 and a set of one or more memory access units 164. The execution units 162 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 156, physical register file(s) unit(s) 158, and execution cluster(s) 160 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 164). It should also be understood that where separate pipelines are used, one or more of these pipelines may be out-of-order issue/execution and the rest in-order.

The set of memory access units 164 is coupled to the memory unit 170, which includes a data TLB unit 172 coupled to a data cache unit 174 coupled to a level 2 (L2) cache unit 176. In one exemplary embodiment, the memory access units 164 may include a load unit, a store address unit, and a store data unit, each of which is coupled to the data TLB unit 172 in the memory unit 170. The instruction cache unit 134 is further coupled to a level 2 (L2) cache unit 176 in the memory unit 170. The L2 cache unit 176 is coupled to one or more other levels of cache and eventually to a main memory.

By way of example, the exemplary register renaming, out-of-order issue/execution core architecture may implement the pipeline 100 as follows: 1) the instruction fetch 138 performs the fetch and length decoding stages 102 and 104; 2) the decode unit 140 performs the decode stage 106; 3) the rename/allocator unit 152 performs the allocation stage 108 and renaming stage 110; 4) the scheduler unit(s) 156 performs the schedule stage 112; 5) the physical register file(s) unit(s) 158 and the memory unit 170 perform the register read/memory read stage 114; the execution cluster 160 perform the execute stage 116; 6) the memory unit 170 and the physical register file(s) unit(s) 158 perform the write back/memory write stage 118; 7) various units may be involved in the exception handling stage 122; and 8) the retirement unit 154 and the physical register file(s) unit(s) 158 perform the commit stage 124.

The core 190 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 190 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 134/174 and a shared L2 cache unit 176, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

FIGS. 2A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 2A is a block diagram of a single processor core, along with its connection to the on-die interconnect network 202 and with its local subset of the Level 2 (L2) cache 204, according to embodiments of the invention. In one embodiment, an instruction decoder 200 supports the x86 instruction set with a packed data instruction set extension. An L1 cache 206 allows low-latency accesses to cache memory into the scalar and vector units. While in one embodiment (to simplify the design), a scalar unit 208 and a vector unit 210 use separate register sets (respectively, scalar registers 212 and vector registers 214) and data transferred between them is written to memory and then read back in from a level 1 (L1) cache 206, alternative embodiments of the invention may use a different approach (e.g., use a single register set or include a communication path that allow data to be transferred between the two register files without being written and read back).

The local subset of the L2 cache 204 is part of a global L2 cache that is divided into separate local subsets, one per processor core. Each processor core has a direct access path to its own local subset of the L2 cache 204. Data read by a processor core is stored in its L2 cache subset 204 and can be accessed quickly, in parallel with other processor cores accessing their own local L2 cache subsets. Data written by a processor core is stored in its own L2 cache subset 204 and is flushed from other subsets, if necessary. The ring network ensures coherency for shared data. The ring network is bi-directional to allow agents such as processor cores, L2 caches and other logic blocks to communicate with each other within the chip. Each ring datapath is 1024-bits wide per direction in some embodiments.

FIG. 2B is an expanded view of part of the processor core in FIG. 2A according to embodiments of the invention. FIG. 2B includes an L1 data cache 206A part of the L1 cache 204, as well as more detail regarding the vector unit 210 and the vector registers 214. Specifically, the vector unit 210 is a 6-wide vector processing unit (VPU) (see the 16-wide ALU 228), which executes one or more of integer, single-precision float, and double-precision float instructions. The VPU supports swizzling the register inputs with swizzle unit 220, numeric conversion with numeric convert units 222A-B, and replication with replication unit 224 on the memory input.

Figure 3:
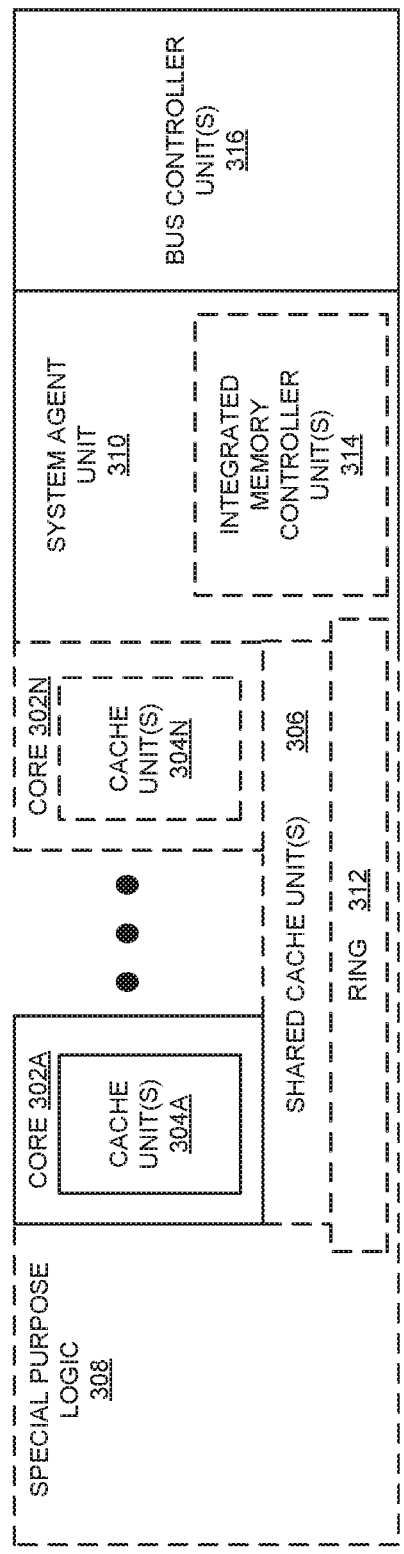
FIG. 3 is a block diagram of a processor that may have more than one core, may have an integrated memory controller, and may have integrated graphics according to embodiments of the invention.

FIG. 3 is a block diagram of a processor 300 that may have more than one core, may have an integrated memory controller, and may have integrated graphics according to embodiments of the invention. The solid lined boxes in FIG. 3 illustrate a processor 300 with a single core 302A, a system agent 310, a set of one or more bus controller units 316, while the optional addition of the dashed lined boxes illustrates an alternative processor 600 with multiple cores 302A-N, a set of one or more integrated memory controller unit(s) 314 in the system agent unit 310, and special purpose logic 308.

Thus, different implementations of the processor 300 may include: 1) a CPU with the special purpose logic 308 being integrated graphics and/or scientific (throughput) logic (which may include one or more cores), and the cores 302A-N being one or more general purpose cores (e.g., general purpose in-order cores, general purpose out-of-order cores, a combination of the two); 2) a coprocessor with the cores 302A-N being a large number of special purpose cores intended primarily for graphics and/or scientific (throughput); and 3) a coprocessor with the cores 302A-N being a large number of general purpose in-order cores. Thus, the processor 300 may be a general purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 300 may be a part of and/or may be implemented on one or more substrates using any of a number of process technologies, such as, for example, BiCMOS, CMOS, or NMOS.

The memory hierarchy includes one or more levels of cache within the cores 304A-N, a set or one or more shared cache units 306, and external memory (not shown) coupled to the set of integrated memory controller units 314. The set of shared cache units 306 may include one or more mid-level caches, such as level 2 (L2), level 3 (L3), level 4 (L4), or other levels of cache, a last level cache (LLC), and/or combinations thereof. While in one embodiment a ring based interconnect unit 312 interconnects the special purpose logic 308, the set of shared cache units 306, and the system agent unit 310/integrated memory controller unit(s) 314, alternative embodiments may use any number of well-known techniques for interconnecting such units. In one embodiment, coherency is maintained between one or more cache units 306 and cores 302-A-N.

In some embodiments, one or more of the cores 302A-N are capable of multithreading. The system agent 310 includes those components coordinating and operating cores 302A-N. The system agent unit 310 may include for example a power control unit (PCU) and a display unit. The PCU may be or include logic and components needed for regulating the power state of the cores 302A-N and the special purpose logic 308.

The cores 302A-N may be homogenous or heterogeneous in terms of architecture instruction set; that is, two or more of the cores 302A-N may be capable of execution the same instruction set, while others may be capable of executing only a subset of that instruction set or a different instruction set.

FIGS. 4-7 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 4:
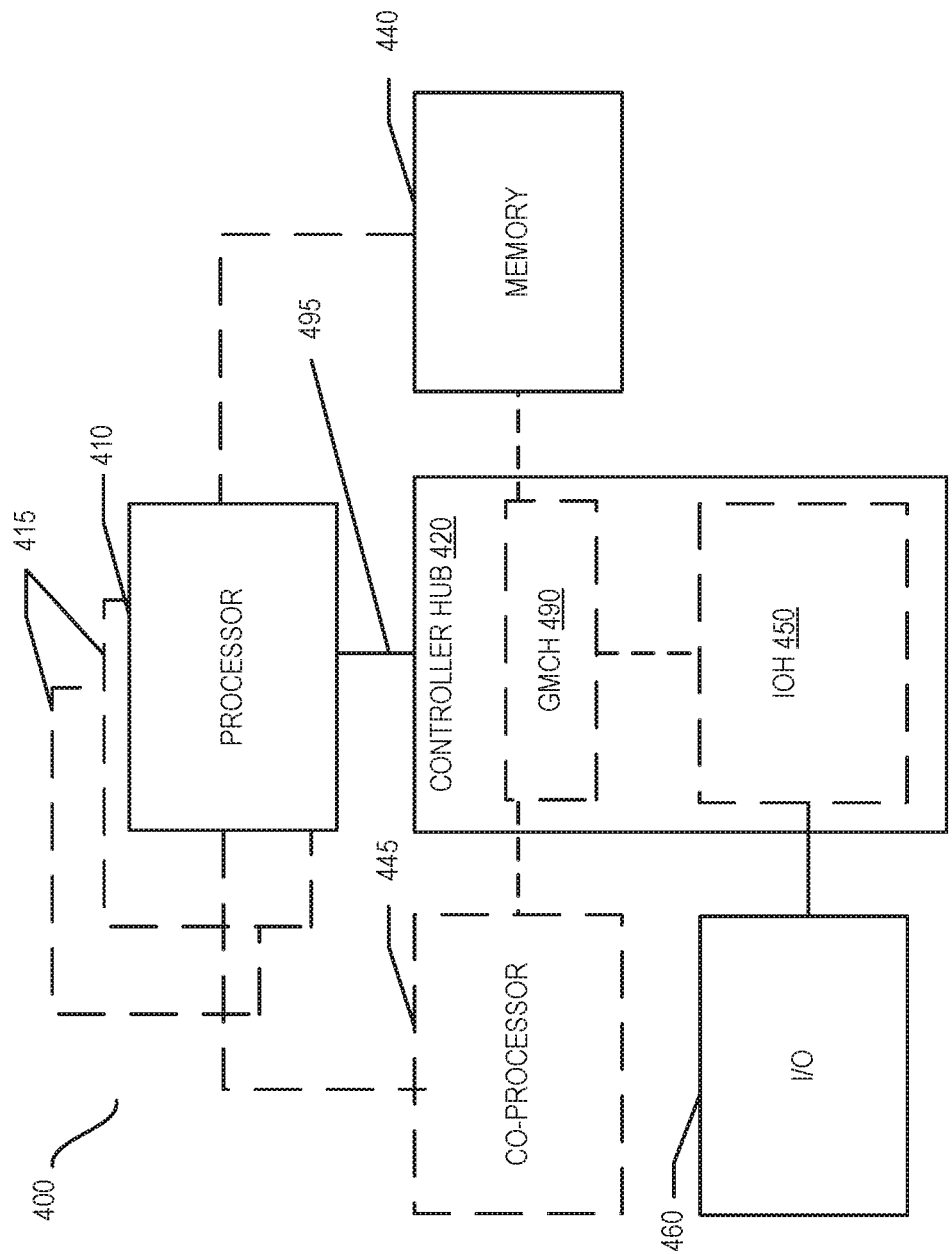
FIG. 4 is a block diagram of a system in accordance with one embodiment of the present invention.

Referring now to FIG. 4, shown is a block diagram of a system 400 in accordance with one embodiment of the present invention. The system 400 may include one or more processors 410, 415, which are coupled to a controller hub 420. In one embodiment, the controller hub 420 includes a graphics memory controller hub (GMCH) 490 and an Input/Output Hub (IOH) 450 (which may be on separate chips); the GMCH 490 includes memory and graphics controllers to which are coupled memory 440 and a coprocessor 445; the IOH 450 is couples input/output (I/O) devices 460 to the GMCH 490. Alternatively, one or both of the memory and graphics controllers are integrated within the processor (as described herein), the memory 440 and the coprocessor 445 are coupled directly to the processor 410, and the controller hub 420 in a single chip with the IOH 450.

The optional nature of additional processors 415 is denoted in FIG. 4 with broken lines. Each processor 410, 415 may include one or more of the processing cores described herein and may be some version of the processor 300.

The memory 440 may be, for example, dynamic random access memory (DRAM), phase change memory (PCM), or a combination of the two. For at least one embodiment, the controller hub 420 communicates with the processor(s) 410, 415 via a multidrop bus, such as a frontside bus (FSB), point-to-point interface, or similar connection 495.

In one embodiment, the coprocessor 445 is a special-purpose processor, such as, for example, a high-throughput MIC processor, a network or communication processor, compression engine, graphics processor, GPGPU, embedded processor, or the like. In one embodiment, controller hub 420 may include an integrated graphics accelerator.

There can be a variety of differences between the physical resources 410, 415 in terms of a spectrum of metrics of merit including architectural, microarchitectural, thermal, power consumption characteristics, and the like.

In one embodiment, the processor 410 executes instructions that control data processing operations of a general type. Embedded within the instructions may be coprocessor instructions. The processor 410 recognizes these coprocessor instructions as being of a type that should be executed by the attached coprocessor 445. Accordingly, the processor 410 issues these coprocessor instructions (or control signals representing coprocessor instructions) on a coprocessor bus or other interconnect, to coprocessor 445. Coprocessor(s) 445 accept and execute the received coprocessor instructions.

Figure 5:
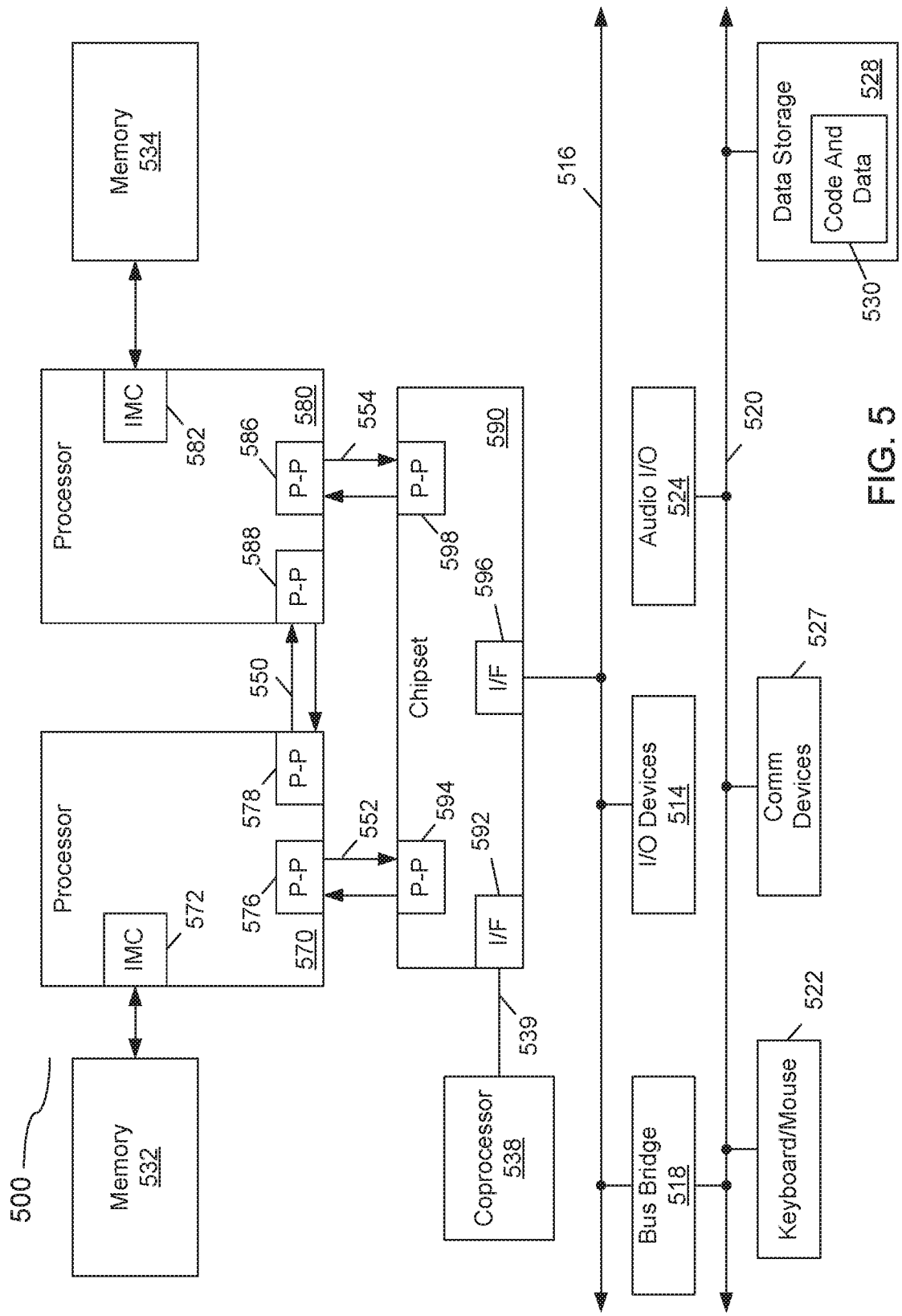
FIG. 5 is a block diagram of a first more specific exemplary system in accordance with an embodiment of the present invention.

Referring now to FIG. 5, shown is a block diagram of a first more specific exemplary system 500 in accordance with an embodiment of the present invention. As shown in FIG. 5, multiprocessor system 500 is a point-to-point interconnect system, and includes a first processor 570 and a second processor 580 coupled via a point-to-point interconnect 550. Each of processors 570 and 580 may be some version of the processor 300. In one embodiment of the invention, processors 570 and 580 are respectively processors 410 and 415, while coprocessor 538 is coprocessor 445. In another embodiment, processors 570 and 580 are respectively processor 410 and coprocessor 445.

Processors 570 and 580 are shown including integrated memory controller (IMC) units 572 and 582, respectively. Processor 570 also includes as part of its bus controller units point-to-point (P-P) interfaces 576 and 578; similarly, second processor 580 includes P-P interfaces 586 and 588. Processors 570, 580 may exchange information via a point-to-point (P-P) interface 550 using P-P interface circuits 578, 588. As shown in FIG. 5, IMCs 572 and 582 couple the processors to respective memories, namely a memory 532 and a memory 534, which may be portions of main memory locally attached to the respective processors.

Processors 570, 580 may each exchange information with a chipset 590 via individual P-P interfaces 552, 554 using point to point interface circuits 576, 594, 586, 598. Chipset 590 may optionally exchange information with the coprocessor 538 via a high performance interface 592. In one embodiment, the coprocessor 538 is a special-purpose processor, such as, for example, a high throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 590 may be coupled to a first bus 516 via an interface 596. In one embodiment, first bus 516 may be a Peripheral Component Interconnect (PCI) bus, or a bus such as a PCI Express bus or another I/O interconnect bus, although the scope of the present invention is not so limited.

As shown in FIG. 5, various I/O devices 514 may be coupled to first bus 516, along with a bus bridge 518 which couples first bus 516 to a second bus 520. In one embodiment, one or more additional processor(s) 515, such as coprocessors, high-throughput MIC processors, GPGPU's, accelerators (such as, e.g., graphics accelerators or digital signal processing (DSP) units), field programmable gate arrays, or any other processor, are coupled to first bus 516. In one embodiment, second bus 520 may be a low pin count (LPC) bus. Various devices may be coupled to a second bus 520 including, for example, a keyboard and/or mouse 522, communication devices 527 and a storage unit 528 such as a disk drive or other mass storage device which may include instructions/code and data 530, in one embodiment. Further, an audio I/O 524 may be coupled to the second bus 516. Note that other architectures are possible. For example, instead of the point-to-point architecture of FIG. 5, a system may implement a multi-drop bus or other such architecture.

Figure 6:
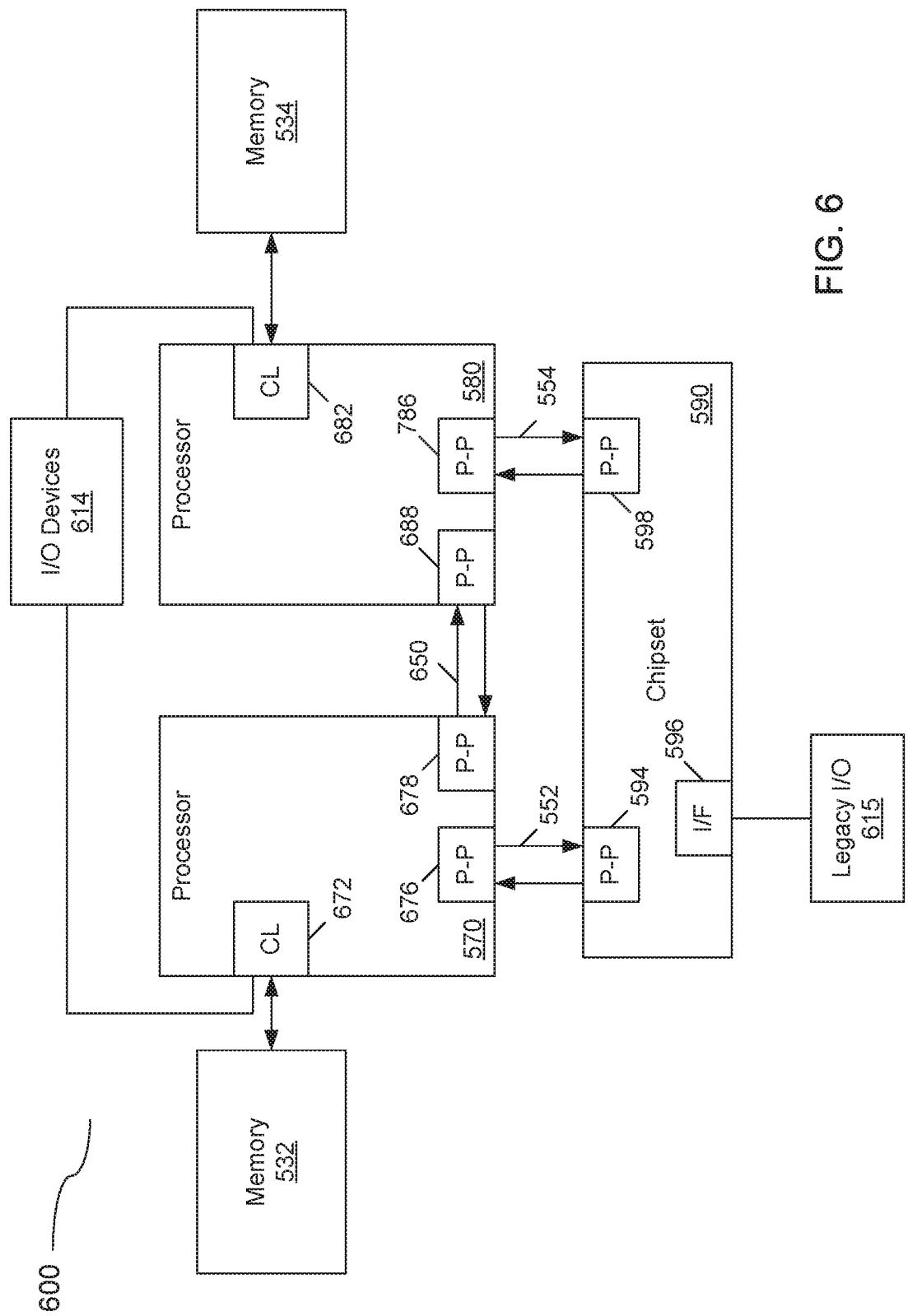
FIG. 6 is a block diagram of a second more specific exemplary system in accordance with an embodiment of the present invention.

Referring now to FIG. 6, shown is a block diagram of a second more specific exemplary system 600 in accordance with an embodiment of the present invention. Like elements in FIGS. 5 and 6 bear like reference numerals, and certain aspects of FIG. 5 have been omitted from FIG. 6 in order to avoid obscuring other aspects of FIG. 6.

FIG. 6 illustrates that the processors 570, 580 may include integrated memory and I/O control logic ("CL") 672 and 682, respectively. Thus, the CL 672, 682 include integrated memory controller units and include I/O control logic. FIG. 6 illustrates that not only are the memories 532, 534 coupled to the CL 572, 582, but also that I/O devices 614 are also coupled to the control logic 572, 582. Legacy I/O devices 615 are coupled to the chipset 590.

Figure 7:
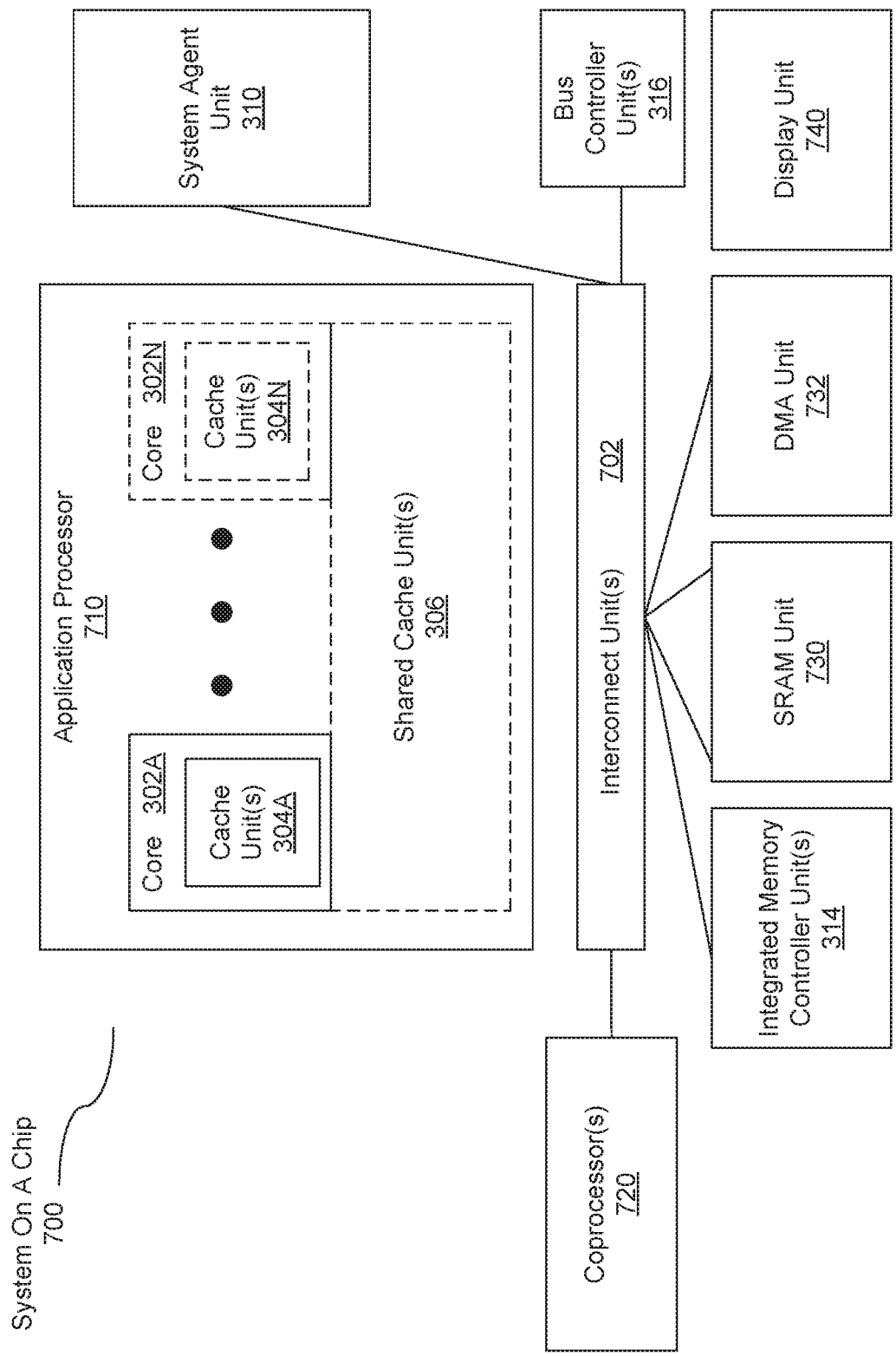
FIG. 7 is a block diagram of a SoC in accordance with an embodiment of the present invention.

Referring now to FIG. 7, shown is a block diagram of a SoC 700 in accordance with an embodiment of the present invention. Similar elements in FIG. 3 bear like reference numerals. Also, dashed lined boxes are optional features on more advanced SoCs. In FIG. 7, an interconnect unit(s) 702 is coupled to: an application processor 710 which includes a set of one or more cores 302A-N, cache units 304A-N, and shared cache unit(s) 306; a system agent unit 310; a bus controller unit(s) 316; an integrated memory controller unit(s) 314; a set or one or more coprocessors 720 which may include integrated graphics logic, an image processor, an audio processor, and a video processor; an static random access memory (SRAM) unit 730; a direct memory access (DMA) unit 732; and a display unit 740 for coupling to one or more external displays. In one embodiment, the coprocessor(s) 720 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 530 illustrated in FIG. 5, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include nontransitory, tangible machine-readable media containing instructions or containing design data, such as Hardware Description Language (HDL), which defines structures, circuits, apparatuses, processors and/or system features described herein. Such embodiments may also be referred to as program products.

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 8:
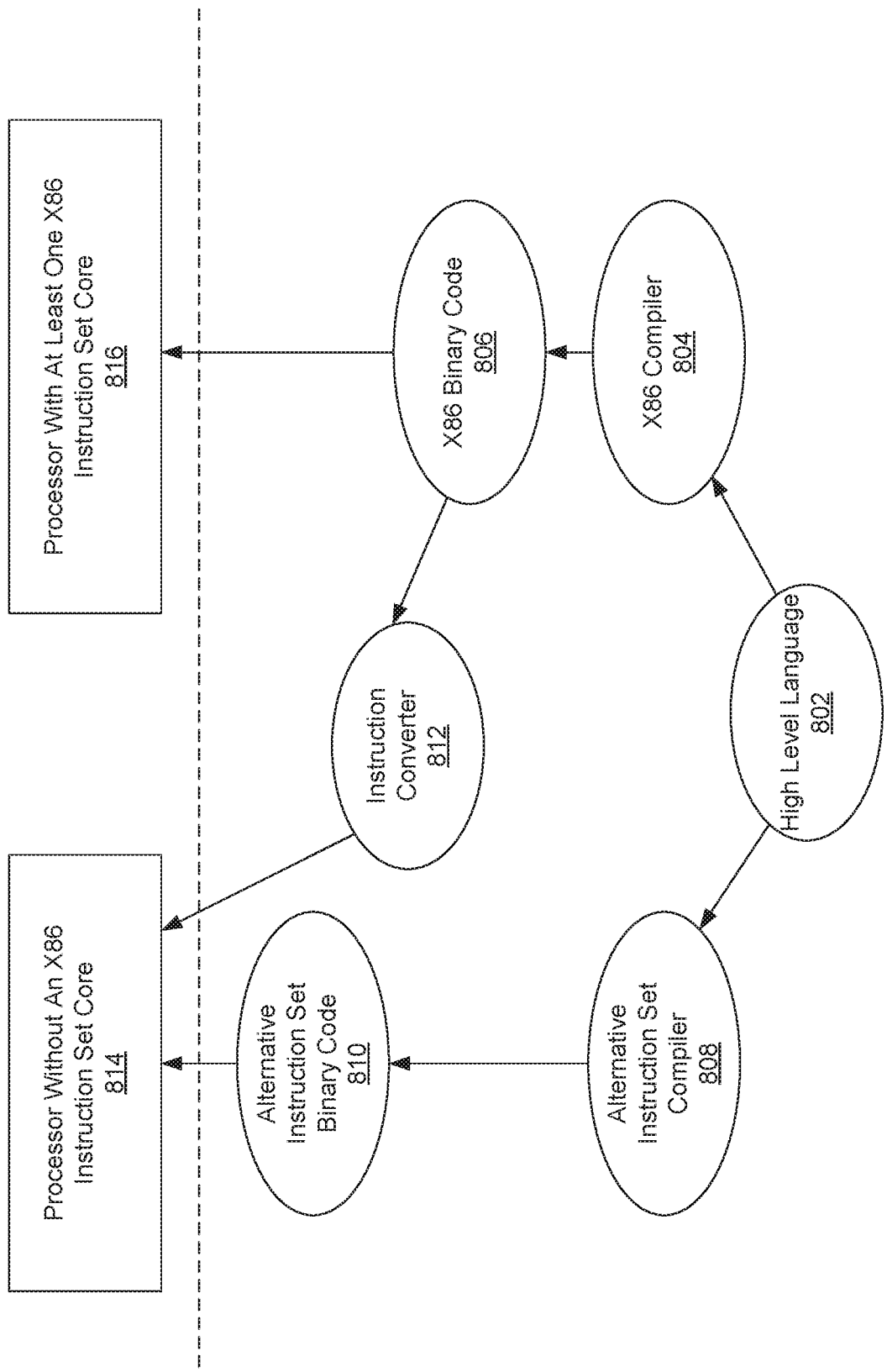
FIG. 8 is a block diagram contrasting the use of a software instruction converter to convert binary instructions in a source instruction set to binary instructions in a target instruction set according to embodiments of the invention.

FIG. 8 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 8 shows a program in a high level language 802 may be compiled using a first compiler 804 to generate a first binary code (e.g., x86) 806 that may be natively executed by a processor with at least one first instruction set core 816. In some embodiments, the processor with at least one first instruction set core 816 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel® processor with at least one x86 instruction set core. The first compiler 804 represents a compiler that is operable to generate binary code of the first instruction set 806 (e.g., object code) that can, with or without additional linkage processing, be executed on the processor with at least one first instruction set core 816. Similarly, FIG. 8 shows the program in the high level language 802 may be compiled using an alternative instruction set compiler 808 to generate alternative instruction set binary code 810 that may be natively executed by a processor without at least one first instruction set core 814 (e.g., a processor with cores that execute the MIPS instruction set of MIPS Technologies of Sunnyvale, Calif. and/or that execute the ARM instruction set of ARM Holdings of Sunnyvale, Calif.). The instruction converter 812 is used to convert the first binary code 806 into code that may be natively executed by the processor without an first instruction set core 814. This converted code is not likely to be the same as the alternative instruction set binary code 810 because an instruction converter capable of this is difficult to make; however, the converted code will accomplish the general operation and be made up of instructions from the alternative instruction set. Thus, the instruction converter 812 represents software, firmware, hardware, or a combination thereof that, through emulation, simulation or any other process, allows a processor or other electronic device that does not have a first instruction set processor or core to execute the first binary code 806.

Instruction set architecture (ISA) extensions for accelerating data parallel workloads require explicit vector word lengths encoded in the machine representation. One embodiment of the invention extends an existing ISA (e.g., such as an x86 ISA) with a scalar microthreaded instruction processing architecture. In particular, a data parallel single program multiple data (SPMD) microarchitecture may be used to provide for scalable execution datapath sizes beyond the limitations of existing instructions, achieving greater instruction execution throughput with reduced energy consumption.

Current CPU architectures have used multiple generations of sub-word single instruction multiple data (SIMD) extensions for accelerating data parallel operations (e.g., including SSE2, SSE4, AVX, and AVX-512 in the x86 architecture). Each successive generation extends the state and instruction set of the CPU, creating legacy performance upside issues and requiring recompilation of old codes.

Graphics processing units (GPUs) have implemented SPMD architectures using hardware divergence stacks to handle divergent control flow cases. The hardware divergence stack is manipulated via explicit instructions and/or control codes as statically implemented by the finalizer agent for existing GPUs.

One embodiment of the invention includes a SPMID data parallel execution engine that uses a scalar microthread abstraction, similar to programming an array of scalar processors with no architected divergence instructions or control codes. As discussed below, these embodiments are particularly suitable for implementation in an existing ISA which includes a predefined Application Binary Interface (ABI).

Figure 9:
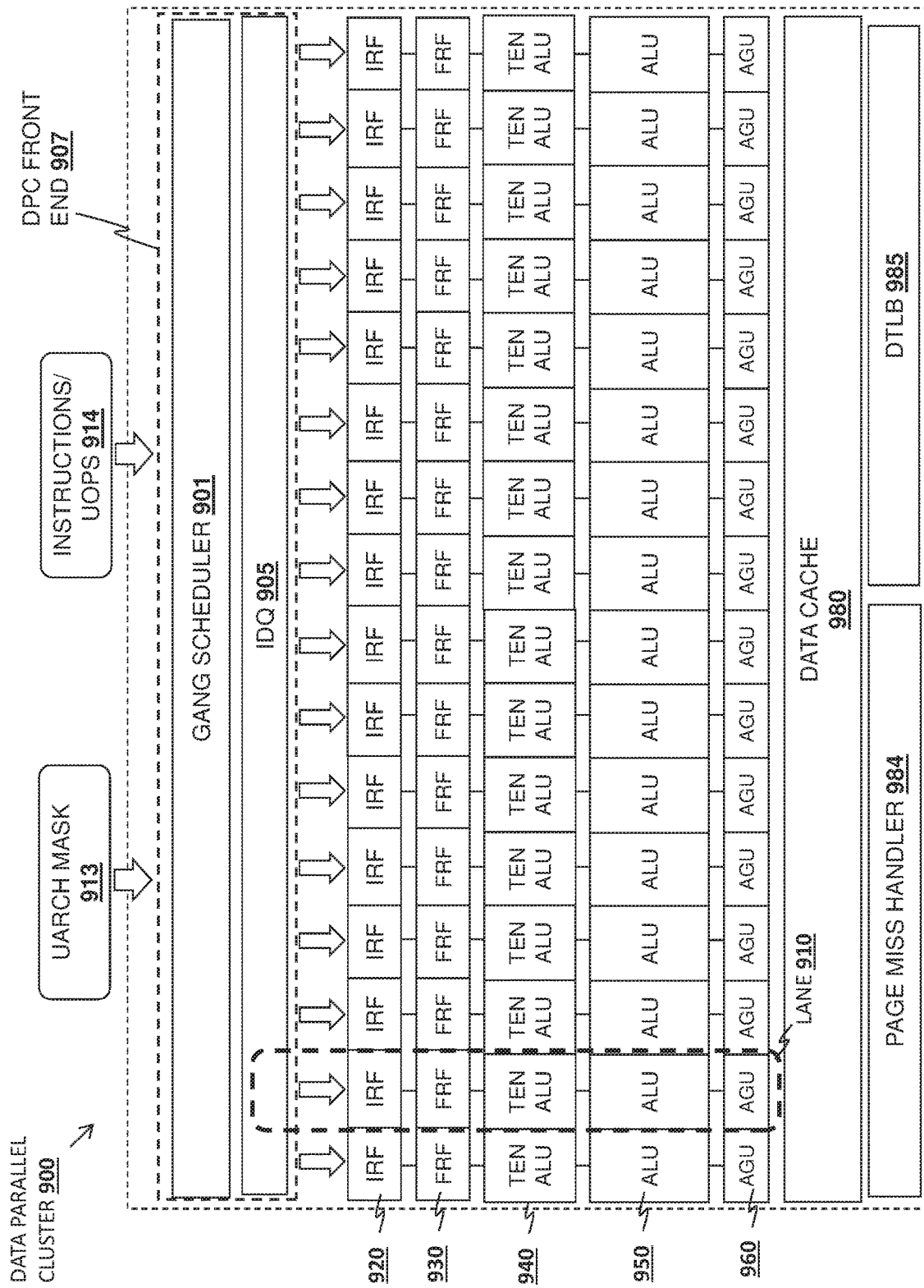
FIG. 9 is a block diagram illustrating one example of a data parallel cluster (DPC) in accordance with an embodiment of the present invention.

FIG. 9 illustrates one example of a data parallel cluster (DPC) 900 which may be integrated within a microarchitecture of a processor and/or may be used as an acceleration engine to execute a particular set of instructions/uops 914. In one embodiment, front end circuitry 907 comprises a gang scheduler 901 to schedule ganged execution of scalar microthreads within a plurality of scalar lanes such as lane 910. The number of scalar lanes in the data parallel cluster 900 can be varied without impacting software. In the illustrated implementation, 16 lanes are shown; however, any number of lanes may be used, depending on the implementation. In one embodiment, 32 lanes may be used.

In one embodiment, the gang scheduler 901 schedules the same instruction on multiple active lanes. A microarchitectural mask 913 (e.g., read from a mask register) disables those lanes that are not required to be active. In one embodiment, the gang scheduler 901 reads the mask values to determine which lanes are to be active for which instructions/uops.

In one embodiment, an instruction decode queue (IDQ) 905 within the front end 907 stores microoperations (uops) of decoded macroinstructions which are added to the IDQ in program order (e.g., in a FIFO implementation). As mentioned, the IDQ 905 may be partitioned for multiple gangs of operation.

Various arrangements for coupling the DPC 900 to a host processor are described below. In an implementation in which instructions are decoded by a host processor, the DPC 900 does not include a decoder to generate the uops prior to execution on the lanes. Alternatively, in an implementation in which macroinstructions are forwarded from a host processor or read directly from memory by the DPC, the front end of the DPC (e.g., the gang scheduler 901) includes a decoder to generate sequences of uops which are then stored in the IDQ prior to execution.

Each lane in the data parallel cluster 900 is coupled to the IDQ 905 from which it receives uops to be executed in parallel. In one embodiment, each lane includes an integer register file (IRF) 920 and a floating-point register file (FRF) 930 for storing integer and floating point operands, respectively. Each lane also includes a tensor arithmetic logic unit (ALU) 940 to perform adaptive lane-wise tensor processing (as described in greater detail below), a per-microthread scalar ALU 950, and a per-microthread, independent address generation unit 960. In one embodiment, the independent AGU 960 provides high throughput address generation for codes with gather/scatter memory access patterns. Other independent functional units may also be allocated to each lane. For example, in one embodiment, each lane is equipped with an independent jump execution unit (JEU) which allows the lanes to diverge and interact with the microarchitectural mask to provide the illusion of independent threads.

The illustrated architecture also includes a shared data cache 980 to store local copies of data for each of the lanes. In one embodiment, if the data parallel cluster 900 is integrated in a chip or system with a host processor, it participates in the cache coherency protocol implemented by the host processor. A page miss handler 984 performs page walk operations to translate virtual addresses to physical (system memory) addresses and a data translation lookaside buffer (DTLB) 985 caches the virtual-to-physical translations.

Figure 10A:
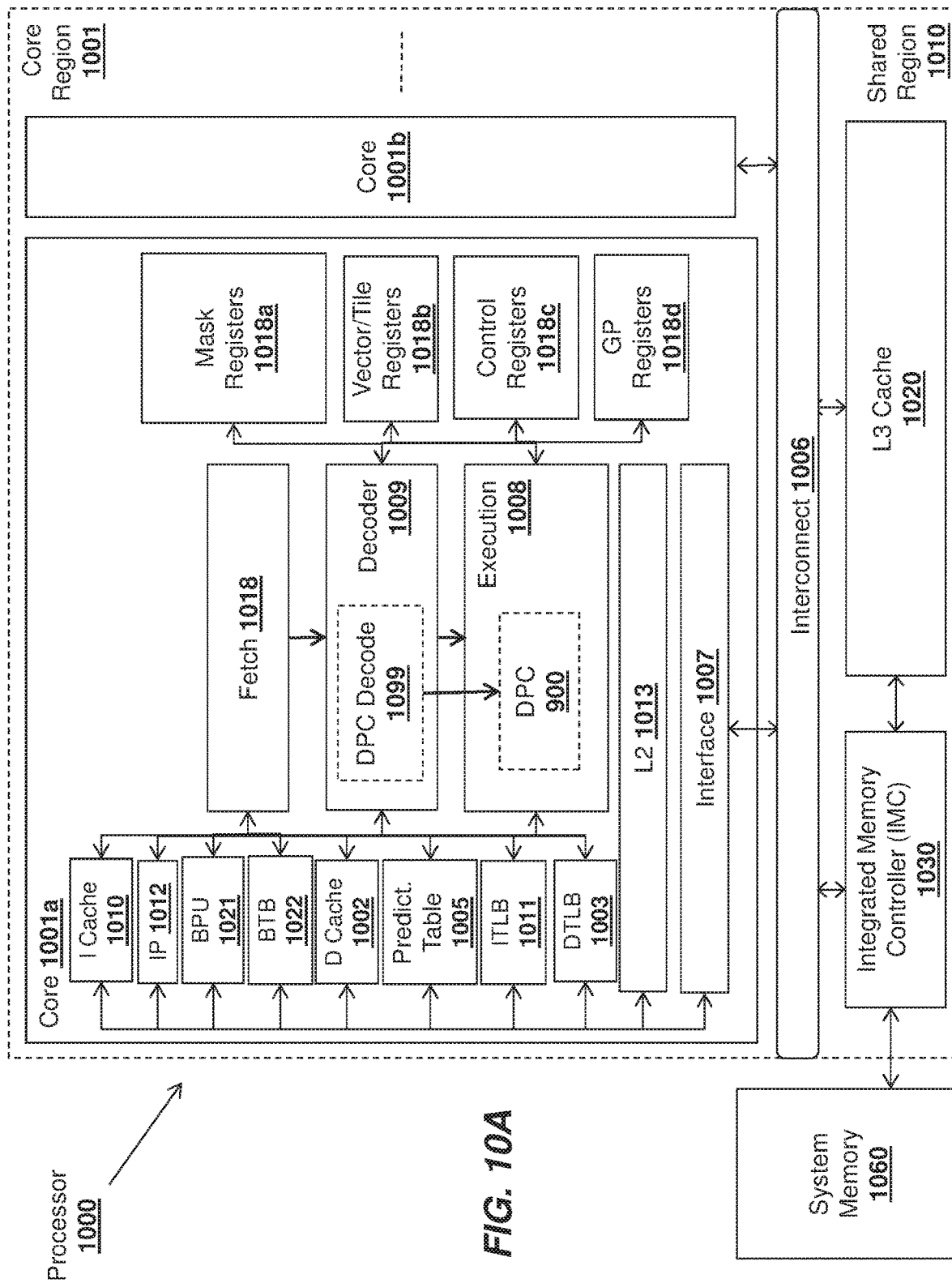
Figure 10B:
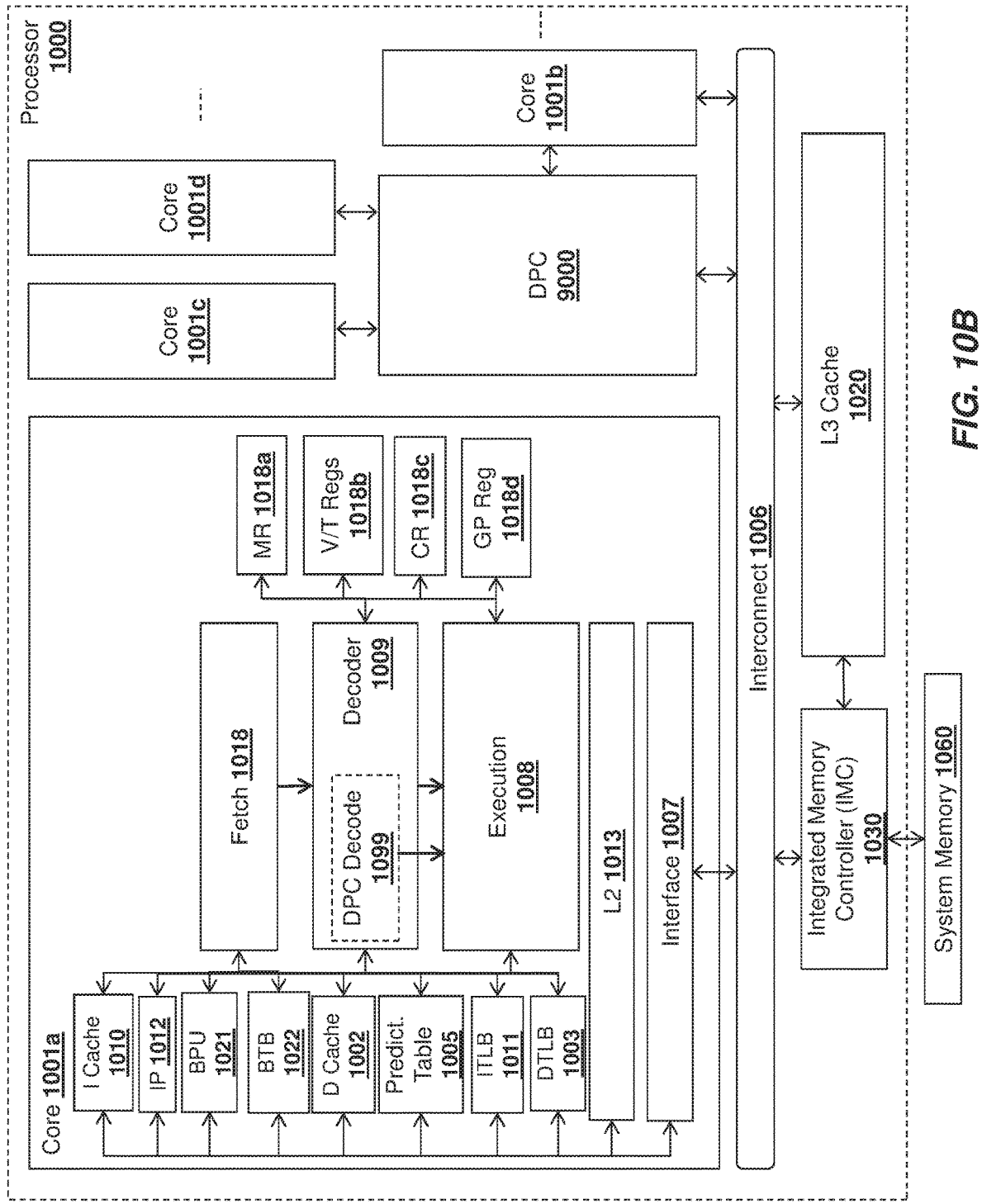

As illustrated in FIGS. 10A-C, the data parallel cluster 900 may be integrated in a computer system in a variety of ways. In FIG. 10A, the DPC 900 is integral to a core 1001a; in FIG. 10B, the DPC 900 is on the same chip and shared by a plurality of cores; and in FIG. 10C, the DPC 900 is on a different chip (but potentially in the same package) as the cores 1001a-b.

Turning first to FIG. 10A, the illustrated architectures include a core region 1001 and a shared, or "uncore" region 1010. The shared region 1010 includes data structures and circuitry shared by all or a subset of the cores 1001a-b. In the illustrated embodiment, the plurality of cores 1001a-b are simultaneous multithreaded cores capable of concurrently executing multiple instruction streams or threads. Although only two cores 1001a-b are illustrated in FIG. 10A for simplicity, it will be appreciated that the core region 1001 may include any number of cores, each of which may include the same architecture as shown for core 1001a. Another embodiment includes heterogeneous cores which may have different instruction set architectures and/or different power and performance characteristics (e.g., low power cores combined with high power/performance cores).

The various components illustrated in FIG. 10A may be implemented in the same manner as corresponding components in FIGS. 1-7. In addition, the cores 1001a may include the components of core 190 shown in FIG. 1B, and may include any of the other processor/core components described herein (e.g., FIGS. 2A-B, FIG. 3, etc.).

Each of the cores 1001a-b include instruction pipeline components for performing simultaneous execution of instruction streams including instruction fetch circuitry 1018 which fetches instructions from system memory 1060 or the instruction cache 1010 and decoder 1009 to decode the instructions. Execution circuitry 1008 executes the decoded instructions to perform the underlying operations, as specified by the instruction operands, opcodes, and any immediate values.

In the illustrated embodiment, the decoder 1009 includes DPC instruction decode circuitry 1099 to decode certain instructions into uops for execution by the DPC 900 (integrated within the execution circuitry 1008 in this embodiment). Although illustrated as separate blocks in FIG. 10A, the DPC decode circuitry 1099 and DPC 900 may be distributed as functional circuits spread throughout the decoder 1009 and execution circuitry 1008.

In an alternate embodiment, illustrated in FIG. 10B, the DPC 900 is tightly coupled to the processor cores 1001a-b over a cache coherent interconnect (e.g., in which a data cache participates in the same set of cache coherent memory transactions as the cores). The DPC 900 is configured as a peer of the cores, participating in the same set of cache coherent memory transactions as the cores. In this embodiment, the decoders 1009 decode the instructions which are to be executed DPC 900 and the resulting microoperations are passed for execution to the DPC 900 over the interconnect 1006. In another embodiment, the DPC 900 includes its own fetch and decode circuitry to fetch and decode instructions, respectively, from a particular region of system memory 1060. In either implementation, after executing the instructions, the DPC 900 may store the results to the region in system memory 1460 to be accessed by the cores 1001a-b.

FIG. 10C illustrates another embodiment in which the DPC is on a different chip from the cores 1001a-b but coupled to the cores over a cache coherent interface 1096. In one embodiment, the cache coherent interface 1096 uses packet-based transactions to ensure that the data cache 980 of the DPC 900 is coherent with the cache hierarchy of the cores 1001a-b.

Also illustrated in FIGS. 10A-C are general purpose registers (GPRs) 1018d, a set of vector/tile registers 1018b, a set of mask registers 1018a (which may include tile mask registers as described below), and a set of control registers 1018c. In one embodiment, multiple vector data elements are packed into each vector register which may have a 512 bit width for storing two 256 bit values, four 128 bit values, eight 64 bit values, sixteen 32 bit values, etc. Groups of vector registers may be combined to form the tile registers described herein. Alternatively, a separate set of 2-D tile registers may be used. However, the underlying principles of the invention are not limited to any particular size/type of vector/tile data. In one embodiment, the mask registers 1018a include eight 64-bit operand mask registers used for performing bit masking operations on the values stored in the vector registers 1018b (e.g., implemented as mask registers k0-k7 described above). However, the underlying principles of the invention are not limited to any particular mask register size/type. A set of one or more mask registers 1018a may implement the tile mask registers described herein.

The control registers 1018c store various types of control bits or "flags" which are used by executing instructions to determine the current state of the processor core 1001a. By way of example, and not limitation, in an x86 architecture, the control registers include the EFLAGS register.

An interconnect 1006 such as an in-die interconnect (IDI) or memory fabric implementing an IDI/coherence protocol communicatively couples the cores 1001a-b (and potentially a the DPC 900) to one another and to various components within the shared region 1010. For example, the interconnect 1006 couples core 1001a via interface 1007 to a level 3 (L3) cache 1013 and an integrated memory controller 1030. In addition, the interconnect 1006 may be used to couple the cores 1001a-b to the DPC 900.

The integrated memory controller 1030 provides access to a system memory 1060. One or more input/output (I/O) circuits (not shown) such as PCI express circuitry may also be included in the shared region 1010.

An instruction pointer register 1012 stores an instruction pointer address identifying the next instruction to be fetched, decoded, and executed. Instructions may be fetched or prefetched from system memory 1060 and/or one or more shared cache levels such as an L2 cache 1013, the shared L3 cache 1020, or the L1 instruction cache 1010. In addition, an L1 data cache 1002 stores data loaded from system memory 1060 and/or retrieved from one of the other cache levels 1013, 1020 which cache both instructions and data. An instruction TLB (ITLB) 1011 stores virtual address to physical address translations for the instructions fetched by the fetch circuitry 1018 and a data TLB (DTLB) 1003 stores virtual-to-physical address translations for the data processed by the decode circuitry 1009 and execution circuitry 1008.

A branch prediction unit 1021 speculatively predicts instruction branch addresses and branch target buffers (BTBs) 1022 for storing branch addresses and target addresses. In one embodiment, a branch history table (not shown) or other data structure is maintained and updated for each branch prediction/misprediction and is used by the branch prediction unit 1002 to make subsequent branch predictions.

Note that FIGS. 10A-C are not intended to provide a comprehensive view of all circuitry and interconnects employed within a processor. Rather, components which are not pertinent to the embodiments of the invention are not shown. Conversely, some components are shown merely for the purpose of providing an example architecture in which embodiments of the invention may be implemented.

Returning to FIG. 9, the processing cluster 900 is arranged into a plurality of lanes 910 that encapsulate execution resources (e.g., an IRF 920, an FRF 930, a tensor ALU 940, an ALU 950, and an AGU 960) for several microthreads. Multiple threads share a given lane's execution resources in order to tolerate pipeline and memory latency. The per-microthread state for one implementation is a subset of a modern processor state.

Figure 11:
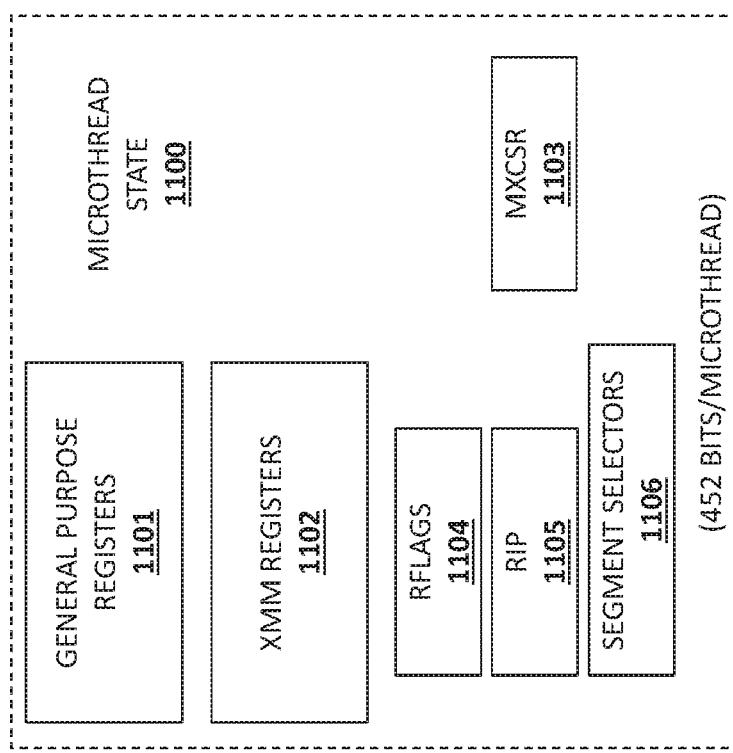
FIG. 11 illustrates one example of a microthread state in accordance with an embodiment of the present invention.

FIG. 11 illustrates one example of a microthread state 1100 which is a subset of a scalar x86 state. The microthread state 1100 includes state from general purpose registers 1101 (e.g., sixteen 64-bit registers), XMM registers 1102 (e.g., thirty-two 64-bit registers), an RFLAGS register 1104, an instruction pointer register 1105, segment selectors 1106, and the MXCSR register 1103. Using a subset of a scalar x86 is convenient for programmers, is software compatible with existing x86 codes, and requires minimal changes to current compilers and software toolchains. The lanes of this embodiment execute scalar, user-level instructions. Of course, the underlying principles of the invention are not limited to this particular arrangement.

Figure 12:
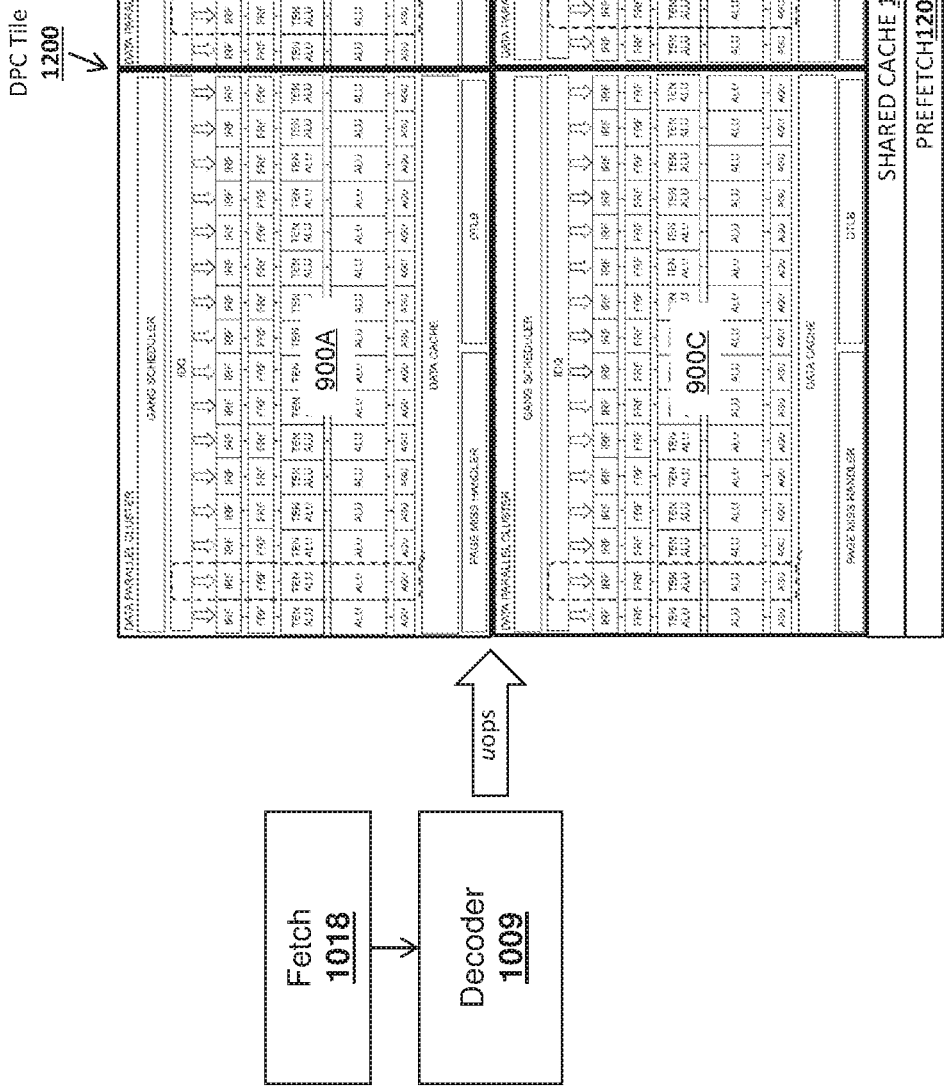
FIG. 12 is a block diagram of multiple data parallel clusters collocated into a larger unit of scaling in accordance with an embodiment of the present invention.

In one embodiment, illustrated in FIG. 12, multiple data parallel clusters 900A-D are collocated into a larger unit of scaling referred to as a "DPC tile" 1200. The various data parallel clusters 900A-D may be coupled to one another over a high speed interconnect of fabric. The DPC tile 1200 may be integrated within a processor or computer system using any of the microarchitectural implementations described above with respect to the single DPC 900 in FIG. 10A-C (i.e., DPC tile 1200 may be substituted for the DPC 900 in these figures).

The DPC tile 1200 includes a shared cache 1201 and relies on the existing fetch 1018 and decoder 1009 of one or more cores. A prefetcher 1202 prefetches data from system memory and/or the cache hierarchy in anticipation of uops executed on the data parallel clusters 900A-D. Although not illustrated, the shared cache 1201 may be coupled between the data parallel clusters 900A-D and each DPC 900A-D may be coupled to the on-chip interconnection network (e.g., IDI).

Sharing the execution resources of a processor across a whole cluster amortizes the relatively complex decode process performed by decoder 1009. One embodiment of the invention can support hundreds of microthreads executing instructions using a tiny fraction of the fetch 1018 and decoder 1009 resources of a conventional processor design.

By using a POQ, the program order of instructions may be tracked in a very concise form before they are allocated to the instruction queues. In turn, this program order data may be used to guide instruction dispatch and execution from the instruction queues. In an embodiment, the POQs include N queues, one POQ for each architectural register. For M instruction queues, a baseline POQ arrangement is configured so that the state stored in the POQs is one of 2*M states encoded as follows: "Ri," a read event, which may be written into a POQ entry when a register is used as a source operand of an instruction allocated to instruction queue i; and "Wi," a write event, which may be written into a POQ entry when a register is a destination operand of an instruction allocated to instruction queue i.

By leveraging information in the POQ, instructions may be dispatched and executed from the multiple instruction queues without violating WAR, RAW and WAW dependencies between instructions as specified by the program order. In an embodiment, there are three events that cause the state of the POQs to change: (1) allocation, when an instruction is allocated to one of M instruction queues; (2) dispatch, when an instruction is dispatched from an instruction queue for execution; and (3) completion, when an instruction completes execution and is written to a destination register.

Before an instruction is allocated to instruction queue i, for every register-based source operand of the instruction, a read state "Ri" to identify a register read and an instruction queue from which the instruction issued is written into the POQ corresponding to the register-based operand. If the destination of the instruction is also a register, then a write state "Wi" to identify a register write and an instruction queue from which the instruction issued is written into the POQ corresponding to the register-based operand.

In an embodiment, a determination may be made with respect to a next instruction to be dispatched from an instruction queue (namely, a top entry of this first-in-first-out (FIFO) structure). For the instruction to dispatch from instruction queue i, the following two conditions are checked in the POQs: for source operand(s) of the instruction that refer to registers, the corresponding POQ for the registers are checked to confirm that they have the read state for this instruction queue ("Ri") at the top of the POQ; and if a destination operand of the instruction exists and is a register, the corresponding POQ for the register is checked to confirm that it has the write state for this instruction queue ("Wi") at the top of the POQ. If both conditions hold, then the instruction queue can dispatch the instruction. Otherwise, the instruction is stalled until this condition is met. Upon instruction dispatch, the POQs corresponding to source operand registers may be dequeued, but not the destination register POQs. Instead, upon completion of the instruction (when the instruction has been executed by all execution lanes), the top entry in the POQ corresponding to the destination register is dequeued.

As an example of operation of an embodiment, consider a processor architecture having two instruction queues: a first queue for arithmetic-based (e.g., ALU instructions (such as ADD and MUL instructions)) and a second queue for memory-based instructions (e.g., LOAD and STORE instructions). With this architecture, consider the following program order sequence:

1: X3←LOAD 0x10;
2: X1←LOAD 0x20;
3: X2←ADD X1, X3;
4: X3←LOAD 0x30;
5: X1←MUL X3, X2.

Figure 13A:
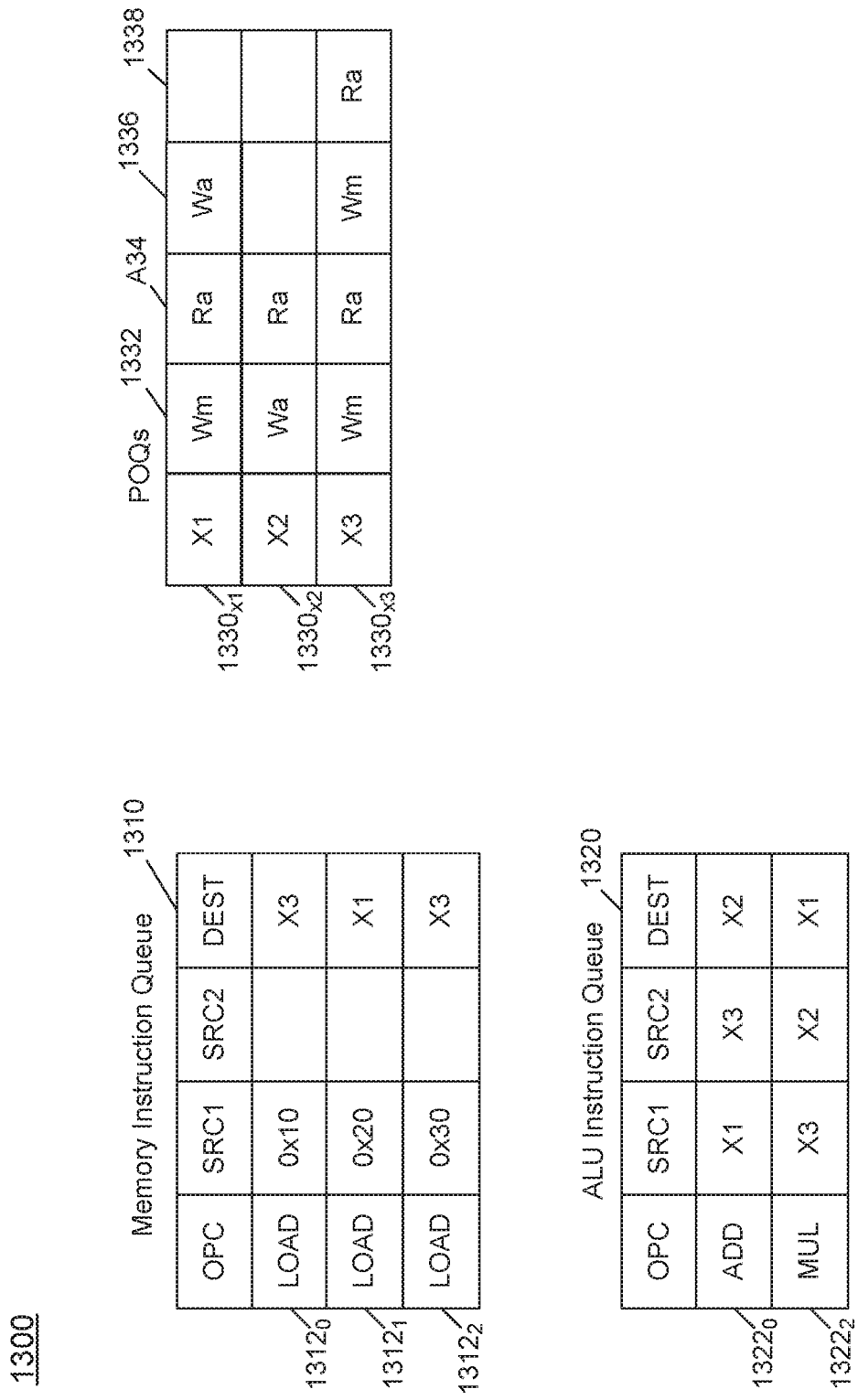
FIGS. 13A-13C are high-level views of a processor architecture in accordance with an embodiment of the present invention.
Figure 13B:
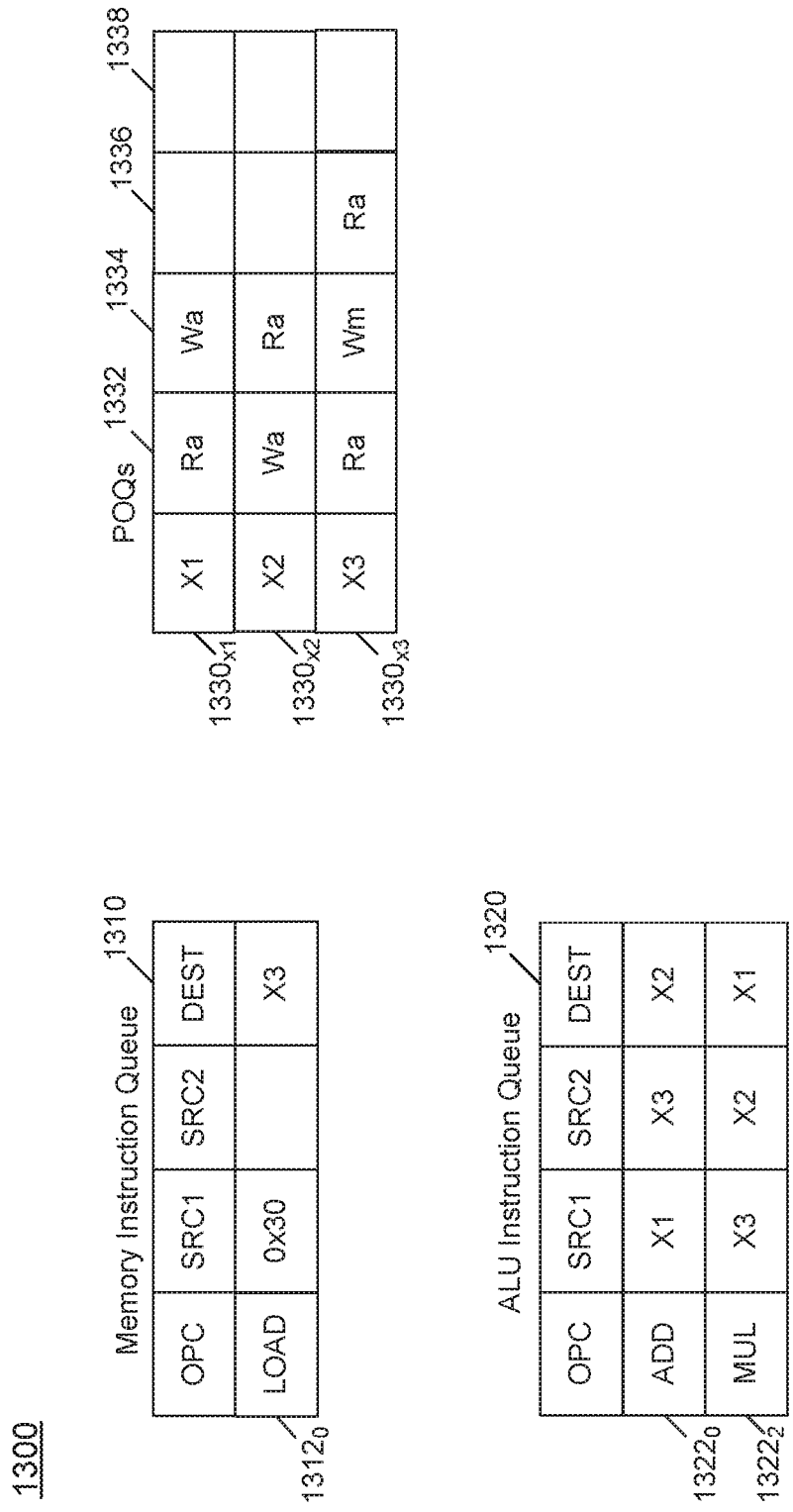
Figure 13C:
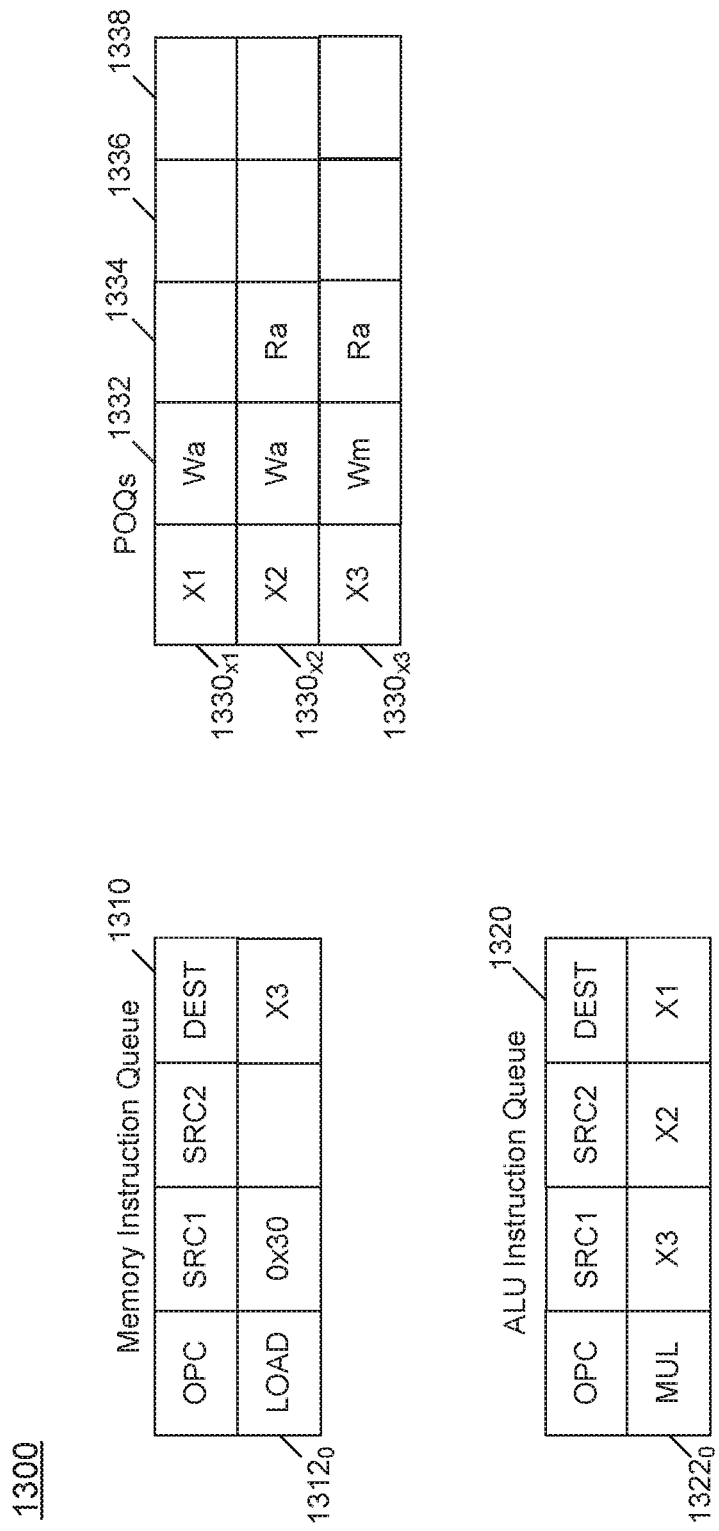

A high-level view of a processor architecture in accordance with an embodiment of the present invention is shown in FIGS. 13A-13C. As illustrated in FIG. 13A, a processor 1300 includes a memory instruction queue 1310 having a plurality of entries $1312_0$-$1312_2$. Memory instruction queue 1310 is an in-order queue or first-in-first-out (FIFO) buffer in which top entry $1312_0$ is the first instruction to be dequeued or dispatched from instruction queue 1310. Similarly, arithmetic logic unit (ALU) instruction queue 1320 is an in-order queue or FIFO buffer in which top entry $1322_0$ is the first instruction to be dequeued or dispatched from instruction queue 1320.

FIG. 13A further illustrates a set of POQs, namely three POQs 1330x1-1330x3 (generally POQ 1330), each of which is associated with a given register (registers X1-X3). As seen, each POQ 1330 includes a plurality of entries 1332-1338, each of which stores a state for an instruction that uses the corresponding register. In the embodiment of FIG. 13A, note that a top entry of POQs 1330, namely entry 1332, is the first entry to be dequeued, since it corresponds to the oldest instruction of a given instruction queue, as POQs 1330 also are implemented as in-order or FIFO buffers.

In FIG. 13A, instruction queues 1310 and 1320 are illustrated with entries written in them for all of the above instructions 1-5. Similarly, POQs 1330, in the FIG. 13A illustration, include corresponding event states for all of instructions 1-5. This arrangement occurs when all instructions have been allocated into instruction queues 1310 and 1320, but none of these instructions 1-5 have been selected or scheduled for dispatch to execution lanes.

As instructions are allocated to instruction queues 1310 and 1320, entries within POQs 1330 are updated according to the allocation procedure described above. The notation Rm/Wm is used to refer to a register of an instruction allocated to memory instruction queue 1310 and the notation Wa/Ra is used for a register of an instruction allocated to ALU instruction queue 1320. Consider the sequence of states in POQ 1330x1 for register X1 as an example: Wm, Ra, Wa. This sequence captures events on register X1 in the program order: X1 is the destination for memory instruction 2 (Wm), then is a source for instruction 3 (Ra), and finally is the destination of the ALU instruction 5 (Wa).

Still with reference to FIG. 13A, the next values to dequeue from POQs 1330x1-x3 are: X1="Wm;" X2="Wa;" and X3="Wm." Considering the above discussion for dispatch operation, instruction 3, the ALU instruction ADD, cannot be dispatched because it requires X1 and X3. POQs 1330x1 and 1330x3 for registers X1 and X3 are thus to have a top entry 1332 state of "Ra" (and X2 POQ 1330x2 to be "Wa") before this instruction dispatches. Therefore, the instruction is stalled until the top of the relevant POQs matches the expected state for the registers. Intuitively, the ADD instruction cannot dispatch because it depends on X1 and X3 that are not yet written.

The memory queue top instruction LOAD (stored in entry $1312_0$ of instruction queue 1310) with a destination of register X3 can be dispatched because the top entry of POQ 1330x3 for X3 is "Wm." When this instruction is dispatched, it is removed from instruction queue 1310, but the destination register state in POQ 1330x3 is not yet updated. This arrangement occurs in order to preserve RAW and WAW dependencies. Once the LOAD to X3 instruction is executed, the next LOAD instruction to X1 can be dispatched since the top entry 1332 in POQ 1330x1 for X1 is "Wm."

After both load instructions complete, the corresponding POQs may be updated by popping the top entries of POQs 1330x1 and 1330x3. The state of the instruction queues and POQs at this point in time is as set forth in FIG. 13B.

Looking at FIG. 13B, the load instruction stored in top entry $1312_0$ of instruction queue 1310 with destination register X3 cannot dispatch because the X3 register POQ 1330x3 has a top entry state value of "Ra". Intuitively, for register X3, to prevent a WAR hazard, this LOAD instruction should not be dispatched since the ADD instruction (in top entry $1322_0$ of instruction queue 1320) is to read X3 first according to program order. As such, this ALU instruction ADD can be dispatched since the two source registers X1, X3 and one destination register X2 match the POQ states of "Ra", "Ra" and "Wa" stored in the top entry 1332 of POQs 1330, respectively. After the dispatch of this ADD instruction, the state stored in the top entries of source registers POQs 1330x1 and 1330x3 (not destination yet) may be dequeued, leading to the state shown in FIG. 13C.

At this point the LOAD instruction with destination register X3 stored in top entry $1312_0$ of instruction queue 1310 can be dispatched. After both this LOAD instruction and the previous ADD instruction complete, the corresponding POQs are updated by popping destination register states from the top entries of POQs 1330x2 and 1330x3, which unblocks the last instruction dispatch.

While the above discussion explains the base operation of a POQ in accordance with an embodiment, there can be some specific conditions such as the source and destination registers of an instruction being the same register. For the example above with two queues, in order to handle this case, an extra state called 'RWa' may be included to indicate this situation where one or both source registers are the same as the destination register. Upon instruction dispatch, this RWa state is converted to a Wa state and upon completion, the Wa state is dequeued. For the example above with two queues, in order to handle this case, an extra state called "RWa" may be included to indicate this situation where one or both source registers are the same as the destination register. Upon instruction dispatch, this RWa state is converted to a Wa state and upon completion, the WA state is dequeued. For such embodiment, there may be 6 unique states (i.e., 3 bits) per POQ entry per destination, namely: val Wa, Wm, Ra, Rm, WmRa, WaRm, RaWa//seven states; val RWa=RaWa// but these two are identical. This particular implementation takes advantage of invariants maintained by uop decoding logic, in addition to the existence of exactly two schedulers ('a' and 'm').

As another variation, two source registers of an instruction being the same can be handled by enqueuing a single Ra/Rm for that register in the POQ and upon dispatch, a single dequeue of this Ra/Rm can be done as well. Adding just a RWa and not a RWm is an optimization specific to certain architectures because a load or store instruction will not have a source register and a destination register that are the same. Note that in other embodiments, additional states may be defined and used in a POQ.

With a POQ-based processor architecture, significant power savings as compared to a full OOO processor architecture can be realized. In particular, since each microthread (uthread) would have taken different paths through the program before arriving at a certain point, each uthread's renaming state would be different and will have to be tracked separately. Having a separate renamer per uthread will be prohibitively expensive. Embodiments avoid the need for a renamer to overcome false data dependencies in an SPMD architecture.

Figure 14:
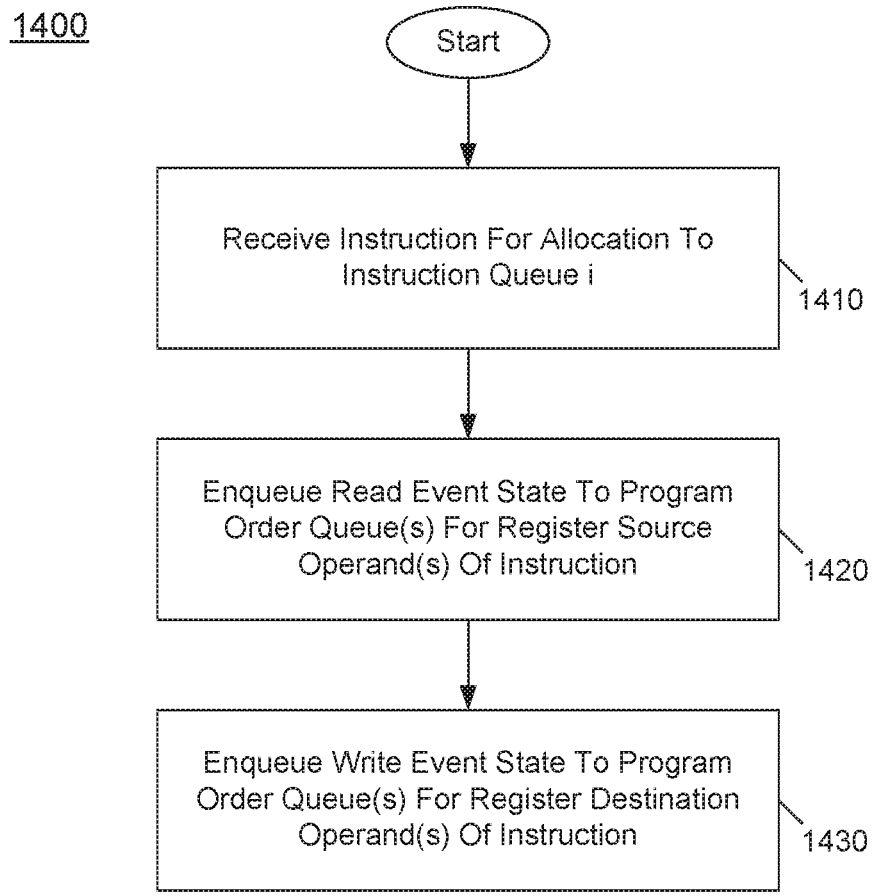
FIG. 14 is a flow diagram of a method in accordance with an embodiment of the present invention.

Referring now to FIG. 14, shown is a flow diagram of a method in accordance with an embodiment of the present invention. As shown in FIG. 14, method 1400 is a method for inserting entries into a program order queue (POQ) on allocation of an instruction into an instruction queue. As such, method 1400 may be performed by a dispatcher that dispatches decoded instructions into an instruction queue. In embodiments, method 1400 may be performed by hardware circuitry, firmware, software and/or combinations thereof.

As illustrated in FIG. 14, method 1400 begins by receiving an instruction for allocation into a given instruction queue i (block 1410). For purposes of discussion herein, assume that this instruction is an arithmetic-based instruction is to be allocated into an ALU instruction queue. Next at block 1420 state information associated with the instruction may be inserted into POQ entries for registers associated with source operands of the instruction. In a particular embodiment with two different instruction queues (an ALU-based instruction queue and a memory-based instruction queue), the state information may be encoded in two bits including a first bit to identify whether a given register is to be read or written by the instruction and another bit to indicate whether the instruction is allocated to the memory-based instruction queue or the ALU-based instruction queue. For example, assume an instruction in which two register values are to be added together. In this case, a read event state may be enqueued or inserted into the corresponding POQ for the two registers.

Further following this example, at block 1430 state information associated with the instruction may be inserted into POQ entries for registers associated with destination operands of the instruction. For example, assume the above instruction in which two register values are to be added together and stored into a destination register. In this case, a write event state may be enqueued or inserted into the corresponding POQ for the destination register. Continuing with the above example, the state information may be encoded in two bits including the first to identify that the destination register is to be written and another bit to indicate the source instruction queue. Understand while shown at this high level in the embodiment of FIG. 14, many variations and alternatives are possible.

Figure 15:
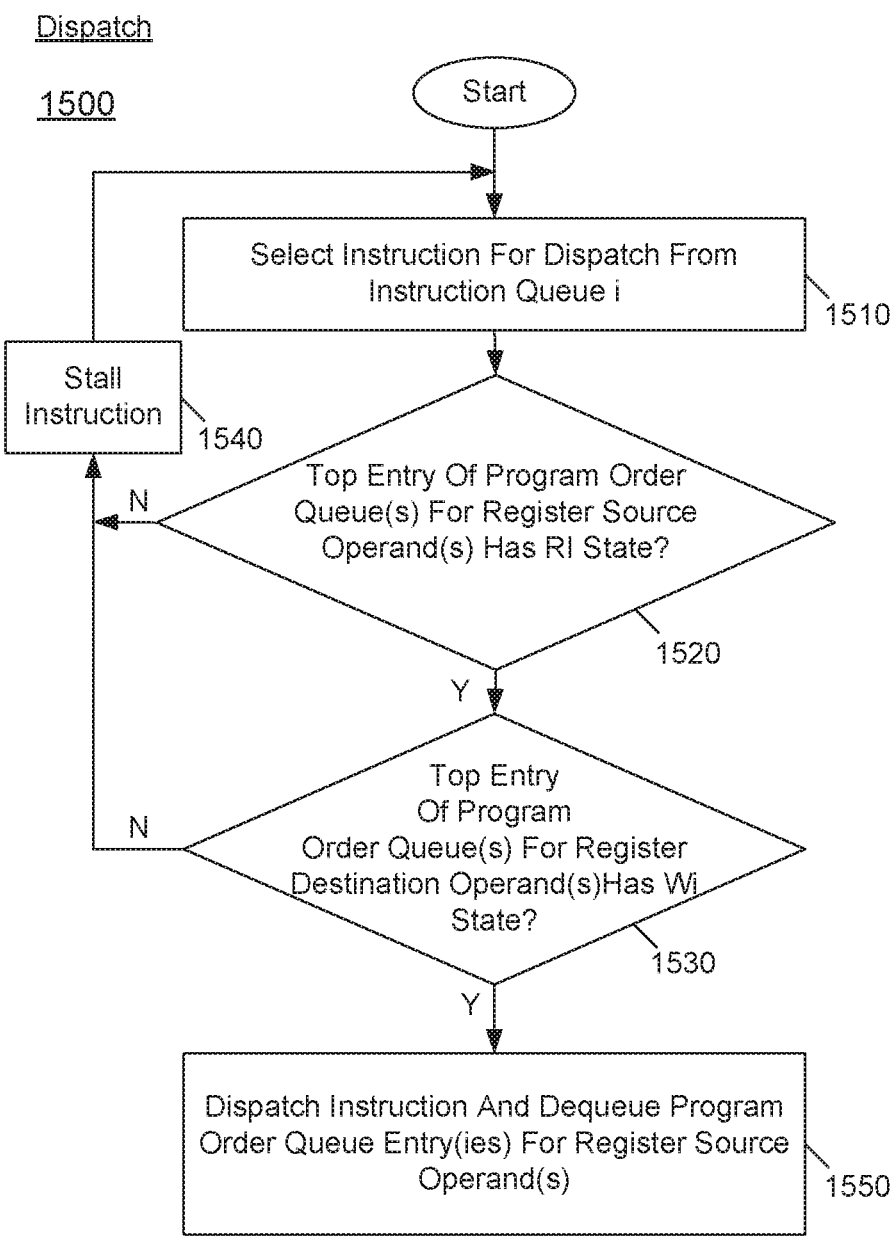
FIG. 15 is a flow diagram of a method in accordance with another embodiment of the present invention.

Referring now to FIG. 15, shown is a flow diagram of a method in accordance with another embodiment of the present invention. As shown in FIG. 15, method 1500 may is a method for selecting and dispatching an instruction for execution from an instruction queue based at least in part on information in POQ entries, and as such may be performed by a dispatcher or scheduler that dispatches instructions from instruction queue to one or more execution lanes. In embodiments, method 1500 may be performed by hardware circuitry, firmware, software and/or combinations thereof.

As illustrated, method 1500 begins by selecting an instruction for dispatch from a given instruction queue (block 1510). Note that this operation may be performed by scheduler circuitry, e.g., when the given instruction reaches the top of the instruction queue, as the instruction queues are implemented as in-order queues. Control next passes to diamond 1520 to determine whether the top entry of the POQ for any register source operands has a read event state associated with that instruction queue. Assuming that this state is present, this means that the source registers include the appropriate data values for the operation according to correct program order. If this is not the case (i.e., the top entry does not have the Ri state associated with this instruction queue), control passes to block 1540 where the instruction may be stalled.

Still referring to FIG. 15, when it is determined that the top entry for any register source operands has a read event state associated with the instruction queue under analysis, control passes to block 1530, where it is determined whether the top entry of the POQ for any register destination operands has a write event state associated with that instruction queue. Assuming that this state is present, this means that the destination registers is ready to receive the instruction result. If this is not the case (i.e., the top entry does not have the Wi state associated with this instruction queue), the instruction is stalled at block 1540 as discussed above.

When it is determined that the top entry of the POQs for any register source operands has the read event state associated with the given instruction queue and the top entry of the POQs for any register destination operands has the write event state associated with this instruction queue, the instruction is ready for dispatch. As such, control passes to block 1550 where the instruction may be dispatched for execution. In an embodiment with an SPMD architecture, this instruction may be sent for execution in the parallel execution lanes. In addition at block 1550 the POQ entries for register source operands may be dequeued at this point. Note however that any POQ entries for register destination operands remain in their POQs to prevent write-after-write or write-after-read dependencies. As described further herein, these entries may not be removed or dequeued until the instruction is completed.

Figure 16:
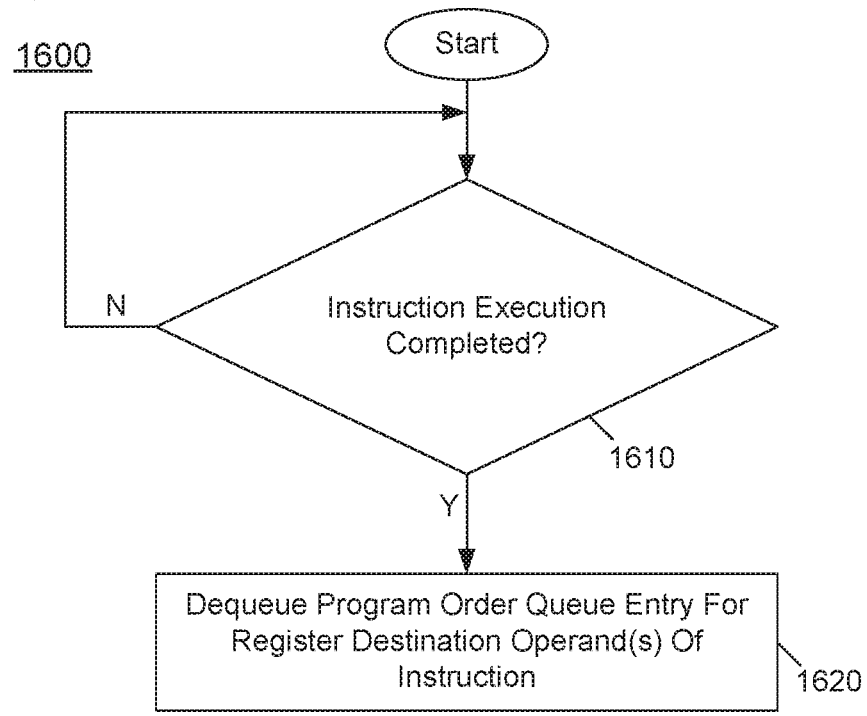
FIG. 16 is a flow diagram of a method in accordance with yet another embodiment of the present invention.

Referring now to FIG. 16, shown is a flow diagram of a method in accordance with yet another embodiment of the present invention. In FIG. 16, a method 1600 for handling operations in a POQ at instruction completion is shown. As shown, method 1600 is a method for updated one or more POQ entries at instruction completion, and as such may be performed by a retirement and related control circuitry. In embodiments, method 1600 may be performed by hardware circuitry, firmware, software and/or combinations thereof.

As illustrated, method 1600 begins by determining at diamond 1610 whether a given instruction execution has completed. In an embodiment with a SPMD architecture, this determination may be in the affirmative when all parallel execution lanes have completed execution of the instruction. To track this information, in one embodiment tracker circuitry may maintain a bit vector for an instruction that includes a bit for each execution lane. This bit vector receives a completion signal from each execution lane when it has completed the instruction, such that the bit is set for the corresponding execution lane in response to this completion signal. Thus this bit vector for the given instruction, when all bits are set, indicates that the instruction has been completed across all execution lanes. And to identify this situation further, when the bit vector is fully set, a top of queue entry in the POQs may include an additional bit of state, which when set identifies that the corresponding instruction has been completed across all execution lanes. Thus the determination at diamond 1610 may be based on a set value for this completion bit in the top of queue entry of the POQs. When this determination is made, control passes to block 1620 where the POQ entry, namely the top of queue entry, for any register destination operands of the instruction may be dequeued, as the instruction execution result has been completed such that for an ALU-based operation, the result has been written to the destination register(s). Understand while shown at this high level in the embodiment of FIG. 16, many variations and alternatives are possible.

The following examples pertain to further embodiments.

In one example, an apparatus includes: a plurality of registers; a first instruction queue to store first instructions to be dispatched to one or more execution circuits; a second instruction queue to store second instructions to be dispatched to the one or more execution circuits; a program order queue having a plurality of portions each associated with one of the plurality of registers, each of the plurality of portions comprising a plurality of entries each to store a state of an instruction, the state comprising an encoding of a use of the register by the instruction and a source instruction queue for the instruction; and a dispatcher to dispatch for execution the first instructions from the first instruction queue and the second instructions from the second instruction queue based at least in part on information stored in the program order queue, to manage instruction dependencies between the first instructions and the second instructions.

In an embodiment, the instruction dependencies include write-after-read dependencies, read-after-write dependencies and write-after-write dependencies.

In an embodiment, for a first instruction of the first instructions having a first source operand that identifies a first register and a destination operand that identifies a second register, the program order queue is to store in a first portion of the program order queue associated with the first register a read event state and store in a second portion of the program order queue associated with the second register a write event state.

In an embodiment, the read event state is to identify that the first instruction is stored in the first instruction queue.

In an embodiment, the program order queue is to store the read event state and the write event state on allocation of the first instruction into the first instruction queue.

In an embodiment, the dispatcher is to dispatch the first instruction from the first instruction queue to the one or more execution circuits when a top entry of the first portion of the program order queue includes the read event state and a top entry of the second portion of the program order queue includes the write event state.

In an embodiment, the program order queue is to dequeue the top entry of the first portion of the program order queue when the first instruction is completed.

In an embodiment, the dispatcher is to stall the first instruction in the first instruction queue when the top entry of the first portion of the program order queue does not include the read event state or the top entry of the second portion of the program order queue does not include the write event state.

In an embodiment, for a first instruction of the first instructions having a first source operand that identifies a first register and a destination operand that identifies the first register, the program order queue is to store in a first portion of the program order queue associated with the first register a read write event state.

In an embodiment, the apparatus comprises a single program multiple data processor including a plurality of execution lanes each including the one or more execution circuits, where each of the plurality of lanes is to execute instructions dispatched by the dispatcher.

In an embodiment, the first instruction queue and the second instruction queue comprise in-order queues, the first instruction queue to store memory instructions and the second instruction queue to store arithmetic instructions.

In another embodiment, method comprises: receiving a first instruction for allocation into a first instruction queue of a processor, the first instruction identifying a first register as a first source operand and identifying a second register as a destination operand; enqueuing, into a first program order queue associated with the first register, a read event state that indicates that the first instruction is to read the first register and is allocated into the first instruction queue; enqueuing into a second program order queue associated with the second register, a write event state that indicates that the first instruction is to write the second register and is allocated into the first instruction queue; and controlling dispatch of the first instruction from the first instruction queue to at least one execution circuit based on contents of at least one entry of the first program order queue and at least one entry of the second program order queue.

In an embodiment, the method further comprises: selecting the first instruction for dispatch to at least one execution circuit; determining whether a top entry of the first program order queue has the read event state that indicates that the first instruction is to read the first register and is allocated into the first instruction queue; and responsive, at least in part to determining that the top entry of the first program order queue has the read event state that indicates that the first instruction is to read the first register and is allocated into the first instruction queue, dispatching the first instruction to the at least one execution circuit.

In an embodiment, the method further comprises: responsive to dispatching the first instruction to the at least one execution circuit, dequeuing the top entry of the first program order queue; and responsive to completion of the first instruction in the at least one execution circuit, dequeuing the top entry of the second program order queue.

In an embodiment, the method further comprises responsive to determining that the top entry of the first program order queue does not have the read event state that indicates that the first instruction is to read the first register and is allocated into the first instruction queue, stalling the first instruction in the first instruction queue.

In an embodiment, the method further comprises: determining whether a top entry of the second program order queue has the write event state that that indicates that the first instruction is to write the second register and is allocated into the first instruction queue; and further responsive to determining that the top entry of the second program order queue has the write event state that indicates that the first instruction is to write the second register and is allocated into the first instruction queue, dispatching the first instruction to the at least one execution circuit.

In another example, a computer readable medium including instructions is to perform the method of any of the above examples.

In a further example, a computer readable medium including data is to be used by at least one machine to fabricate at least one integrated circuit to perform the method of any one of the above examples.

In a still further example, an apparatus comprises means for performing the method of any one of the above examples.

In another embodiment, a system comprises a processor and a system memory coupled to the processor. The processor comprises: one or more execution circuits to execute instructions; a plurality of registers; a first instruction queue to store memory instructions to be dispatched to the one or more execution circuits; a second instruction queue to store arithmetic instructions to be dispatched to the one or more execution circuits; a plurality of program order queues each associated with one of the plurality of registers, where a first program order queue associated with a first register comprises a plurality of entries each to store a state of an instruction that accesses the first register, and a second program order queue associated with a second register comprises a plurality of entries each to store a state of an instruction that accesses the second register, the state comprising an encoding of a use of the register by the instruction and a source instruction queue for the instruction; and a dispatcher to dispatch an arithmetic instruction from the second instruction queue to the one or more execution circuits for execution based at least in part on information stored in the first program order queue and the second program order queue, where the arithmetic instruction is to access the first register and the second register.

In an embodiment, the state of the instruction comprises an encoding to identify use of the associated register by the instruction and a source instruction queue of the instruction.

In an embodiment, the use of the register comprises a read/write usage.

In an embodiment, the dispatcher is to dispatch the arithmetic instruction from the second instruction queue to the one or more execution circuits when a top entry of the first program order queue includes a read event state to indicate that the arithmetic instruction is to read the first register and a top entry of the second program order queue includes a write event state to indicate that the arithmetic instruction is to write the second register, the first register comprising a source operand of the arithmetic instruction and the second register comprising a destination operand of the arithmetic instruction.

Understand that various combinations of the above examples are possible.

Note that the terms "circuit" and "circuitry" are used interchangeably herein. As used herein, these terms and the term "logic" are used to refer to alone or in any combination, analog circuitry, digital circuitry, hard wired circuitry, programmable circuitry, processor circuitry, microcontroller circuitry, hardware logic circuitry, state machine circuitry and/or any other type of physical hardware component. Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. Embodiments also may be implemented in data and may be stored on a non-transitory storage medium, which if used by at least one machine, causes the at least one machine to fabricate at least one integrated circuit to perform one or more operations. Still further embodiments may be implemented in a computer readable storage medium including information that, when manufactured into a SoC or other processor, is to configure the SoC or other processor to perform one or more operations. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
   a plurality of registers;
   a memory instruction queue to exclusively store memory instructions to be dispatched to one or more execution circuits, each memory instruction comprising a memory source operand and a memory destination operand;
   an arithmetic instruction queue to store arithmetic instructions to be dispatched to the one or more execution circuits, each arithmetic instruction comprising at least one arithmetic source operand and an arithmetic destination operand;
   a plurality of program order queues each associated with a different one of the plurality of registers to be involved in execution of the memory instructions and the arithmetic instructions, wherein a first program order queue associated with a first register comprises a plurality of entries each to store a state of an instruction including the first register as one of the memory source operand, the memory destination operand, the at least one arithmetic source operand, and the arithmetic destination operand, the state comprising an encoding of a use of the first register by the instruction and a source instruction queue for the instruction, the source instruction queue being one of the memory instruction queue and the arithmetic instruction queue; and
   a dispatcher to dispatch for execution the memory instructions from the memory instruction queue and the arithmetic instructions from the arithmetic instruction queue for the execution by the one or more execution circuits based at least in part on information stored in the program order queue, to manage instruction dependencies between the memory instructions and the arithmetic instructions;
   wherein for a first instruction having a first source operand that identifies the first register, the first program order queue is to store in a first entry of the first program order queue a read event state;
   wherein for a second instruction having a second destination operand that identifies the first register, the first program order queue is to store in a second entry of the first program order queue a first write event state.

2. The apparatus of claim 1, wherein the instruction dependencies include write-after-read dependencies, read-after-write dependencies and write-after-write dependencies.

3. The apparatus of claim 1, wherein for the first instruction having a first destination operand that identifies a second register, the first program order queue is to store in a first entry of a second program order queue associated with the second register a write event state, wherein the first source operand is one of the memory source operand and the at least one arithmetic source operand and the first destination operand is one of the memory destination operand and the arithmetic destination operand.

4. The apparatus of claim 3, wherein the read event state is to identify that the first instruction is stored in the source instruction queue.

5. The apparatus of claim 3, wherein the first program order queue and the second program order queue are to store the read event state and the write event state on allocation of the first instruction into the source instruction queue.

6. The apparatus of claim 3, wherein the dispatcher is to dispatch the first instruction from the source instruction queue to the one or more execution circuits when a top entry of the first program order queue includes the read event state and a top entry of the second program order queue includes the write event state.

7. The apparatus of claim 6, wherein the first program order queue is to dequeue the top entry of the first program order queue when the first instruction is completed.

8. The apparatus of claim 6, wherein the dispatcher is to stall the first instruction in the source instruction queue when the top entry of the first program order queue does not include the read event state or the top entry of the second program order queue does not include the write event state.

9. The apparatus of claim 1, wherein for the first instruction having a destination operand that identifies the first register, the first program order queue is to store a read write event state.

10. The apparatus of claim 1, wherein the apparatus comprises a single program multiple data processor including a plurality of execution lanes each including the one or more execution circuits, wherein each of the plurality of execution lanes is to execute instructions dispatched by the dispatcher.

11. The apparatus of claim 1, wherein the memory instruction queue and the arithmetic instruction queue comprise in-order queues.

12. A machine-readable medium having stored thereon instructions, which if performed by a machine cause the machine to perform a method comprising:
  receiving a first instruction for allocation into a first instruction queue of a processor, the first instruction identifying a first register of a plurality of registers as a first source operand and identifying a second register of the plurality of registers as a destination operand, the first instruction queue being one of a memory instruction queue to exclusively store memory instructions and an arithmetic instruction queue to store arithmetic instructions, wherein each register of the plurality of registers is associated with a single program order queue of a plurality of program order queues;
  enqueuing, into a first entry of a first program order queue associated with the first register, a read event state that indicates that the first instruction is to read the first register and is allocated into the first instruction queue;
  enqueuing, into a second entry of the first program order queue associated with the first register, a second write event state that indicates that a second instruction is to write the first register;
  enqueuing, into a second program order queue associated with the second register, a write event state that indicates that the first instruction is to write the second register and is allocated into the first instruction queue; and
  controlling dispatch of the first instruction from the first instruction queue to at least one execution circuit based on contents of at least one entry of the first program order queue and at least one entry of the second program order queue.

13. The machine-readable medium of claim 12, wherein the method further comprises:
  selecting the first instruction for dispatch to the at least one execution circuit;
  determining whether a top entry of the first program order queue has the read event state that indicates that the first instruction is to read the first register and is allocated into the first instruction queue; and
  responsive, at least in part to determining that the top entry of the first program order queue has the read event state that indicates that the first instruction is to read the first register and is allocated into the first instruction queue, dispatching the first instruction to the at least one execution circuit.

14. The machine-readable medium of claim 13, wherein the method further comprises:
  responsive to dispatching the first instruction to the at least one execution circuit, dequeuing the top entry of the first program order queue; and
  responsive to completion of the first instruction in the at least one execution circuit, dequeuing a top entry of the second program order queue.

15. The machine-readable medium of claim 13, wherein the method further comprises responsive to determining that the top entry of the first program order queue does not have the read event state that indicates that the first instruction is to read the first register and is allocated into the first instruction queue, stalling the first instruction in the first instruction queue.

16. The machine-readable medium of claim 13, wherein the method further comprises:
  determining whether a top entry of the second program order queue has the write event state that indicates that the first instruction is to write the second register and is allocated into the first instruction queue; and
  further responsive to determining that the top entry of the second program order queue has the write event state that indicates that the first instruction is to write the second register and is allocated into the first instruction queue, dispatching the first instruction to the at least one execution circuit.

17. A system comprising:
  a processor comprising:
  one or more execution circuits to execute instructions;
  a plurality of registers;
  a memory instruction queue to exclusively store memory instructions to be dispatched to the one or more execution circuits, each memory instruction including a memory source operand and a memory destination operand;
  an arithmetic instruction queue to store arithmetic instructions to be dispatched to the one or more execution circuits, each arithmetic instruction including at least one arithmetic source operand and an arithmetic destination operand;
  a plurality of program order queues each associated with a different one of the plurality of registers to be involved in execution of the memory instructions and the arithmetic instructions, wherein a first program order queue associated with a first register comprises a plurality of entries each to store a state of an instruction including the first register as one of the memory source operand, the memory destination operand, the at least one arithmetic source operand, and the arithmetic destination operand, and a second program order queue associated with a second register comprises a second plurality of entries each to store a second state of the second register as one of the memory source operand, the memory destination operand, the at least one arithmetic source operand, and the arithmetic destination operand, the state comprising an encoding of a use of the first register by the instruction and a source instruction queue for the instruction, the source instruction queue being one of the memory instruction queue and the arithmetic instruction queue; and a dispatcher to dispatch an arithmetic instruction of the arithmetic instructions from the arithmetic instruction queue to the one or more execution circuits for execution based at least in part on information stored in the first program order queue and the second program order queue, wherein the arithmetic instruction is to access the first register and the second register; and a system memory coupled to the processor;

wherein for a first instruction having a first source operand that identifies the first register, the first program order queue is to store in a first entry of the first program order queue a read event state;

wherein for a second instruction having a second destination operand that identifies the first register, the first program order queue is to store in a second entry of the first program order queue a first write event state.

18. The system of claim 17, wherein the state of the instruction comprises an encoding to identify use of the first register by the instruction and a source instruction queue of the instruction.

19. The system of claim 18, wherein the use of the first register comprises a read/write usage.

20. The system of claim 19, wherein the dispatcher is to dispatch the arithmetic instruction from the arithmetic instruction queue to the one or more execution circuits when a top entry of the first program order queue includes the read event state to indicate that the arithmetic instruction is to read the first register and a top entry of the second program order queue includes a write event state to indicate that the arithmetic instruction is to write the second register, the first register comprising the at least one arithmetic source operand of the arithmetic instruction and the second register comprising the arithmetic destination operand of the arithmetic instruction.

* * * * *